United States Patent
Zhang et al.

(10) Patent No.: US 12,451,081 B2
(45) Date of Patent: Oct. 21, 2025

(54) SHIFT REGISTER, SCANNING DRIVING CIRCUIT AND DISPLAYING DEVICE

(71) Applicants: CHENGDU BOE OPTOELECTRONICS TECHNOLOGY CO., LTD., Sichuan (CN); BOE TECHNOLOGY GROUP CO., LTD., Beijing (CN); BEIJING BOE TECHNOLOGY DEVELOPMENT CO., LTD., Beijing (CN)

(72) Inventors: Jingwen Zhang, Beijing (CN); Yao Huang, Beijing (CN); Binyan Wang, Beijing (CN)

(73) Assignees: Chengdu BOE Optoelectronics Technology Co., Ltd., Sichuan (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 18/576,574

(22) PCT Filed: Apr. 28, 2023

(86) PCT No.: PCT/CN2023/091603
§ 371 (c)(1),
(2) Date: Jan. 4, 2024

(87) PCT Pub. No.: WO2024/221410
PCT Pub. Date: Oct. 31, 2024

(65) Prior Publication Data
US 2025/0095589 A1 Mar. 20, 2025

(51) Int. Cl.
G09G 3/3266 (2016.01)
G11C 19/28 (2006.01)
H10K 59/12 (2023.01)

(52) U.S. Cl.
CPC ........... G09G 3/3266 (2013.01); G11C 19/28 (2013.01); H10K 59/12 (2023.02); G09G 2310/0286 (2013.01)

(58) Field of Classification Search
CPC ......... G09G 3/3266; G09G 2310/0286; G11C 19/28; H10K 59/12
(Continued)

(56) References Cited

U.S. PATENT DOCUMENTS

2007/0217563 A1* 9/2007 Chang .................... G11C 19/28
377/64
2018/0122320 A1 5/2018 Sasaki et al.
(Continued)

FOREIGN PATENT DOCUMENTS

| CN | 111477181 A | 7/2020 |
| CN | 111540313 A | 8/2020 |

(Continued)

*Primary Examiner* — Tom V Sheng
(74) *Attorney, Agent, or Firm* — WHDA, LLP

(57) ABSTRACT

The present application relates to a shift register, a scanning driving circuit and a displaying device. The shift register includes a first inputting circuit, a first outputting circuit, a second inputting circuit, a second outputting circuit and a second controlling circuit. The second controlling circuit is electrically connected to a first node, a second node, a fifth voltage terminal, a second clock-signal terminal and a controlling terminal. The second controlling circuit is configured for, under the control of the signal of the second node, the control of a second clock signal and the control of the signal of the controlling terminal, when the first outputting circuit is switched on, disconnecting the electric connection between the first node and the fifth voltage terminal, and when the second outputting circuit is switched on, writing the signal of the fifth voltage terminal into the first node.

18 Claims, 8 Drawing Sheets

(58) Field of Classification Search
USPC .......................................................... 345/204
See application file for complete search history.

(56) References Cited

U.S. PATENT DOCUMENTS

| | | | |
|---|---|---|---|
| 2018/0130541 A1 | 5/2018 | Li et al. | |
| 2018/0226133 A1* | 8/2018 | Feng | G11C 19/28 |
| 2019/0355432 A1* | 11/2019 | Su | G11C 19/28 |
| 2021/0065643 A1* | 3/2021 | Zheng | G09G 3/3677 |
| 2021/0366353 A1* | 11/2021 | Weng | G09G 3/2092 |
| 2022/0114938 A1* | 4/2022 | Feng | G09G 3/20 |
| 2022/0230593 A1* | 7/2022 | Huang | G11C 19/28 |
| 2022/0301510 A1* | 9/2022 | Ma | G11C 19/28 |
| 2022/0310184 A1* | 9/2022 | Zhang | G11C 19/28 |
| 2022/0343855 A1* | 10/2022 | Shang | G11C 19/28 |
| 2023/0162685 A1* | 5/2023 | Lu | G09G 3/3266 |
| | | | 345/204 |
| 2023/0298500 A1* | 9/2023 | Qing | G09G 3/3266 |
| | | | 345/213 |
| 2024/0153571 A1* | 5/2024 | Yuan | G09G 3/3225 |

FOREIGN PATENT DOCUMENTS

| | | |
|---|---|---|
| CN | 113724770 A | 11/2021 |
| CN | 114937471 A | 8/2022 |

\* cited by examiner

SHIFT REGISTER, SCANNING DRIVING CIRCUIT AND DISPLAYING DEVICE

TECHNICAL FIELD

The present application relates to the technical field of displaying and, more particularly, to a shift register, a scanning driving circuit and a displaying device.

BACKGROUND

Scanning driving circuits are an important auxiliary circuit in displaying devices. A scanning driving circuit includes a plurality of shift registers. In operation, the output terminal of the shift register easily appears the problem of outputting instability.

SUMMARY

In an aspect, a shift register is provided by the present application, wherein the shift register includes:
  a first inputting circuit electrically connected to a start-signal terminal, a first node and a first clock-signal terminal, wherein the first inputting circuit is configured for, under control of a first clock signal of the first clock-signal terminal, writing a signal of the start-signal terminal into the first node;
  a first outputting circuit electrically connected to the first node, an output terminal and a first voltage terminal, wherein the first outputting circuit is configured for, when switched on under control of a signal of the first node, writing a signal of the first voltage terminal into the output terminal;
  a second inputting circuit electrically connected to the first node, a second node, a second voltage terminal and the first clock-signal terminal, wherein the second inputting circuit is configured for, under the control of the signal of the first node, writing the first clock signal into the second node, and, under the control of the first clock signal, writing a signal of the second voltage terminal into the second node;
  a second outputting circuit electrically connected to a fourth voltage terminal, the second node and the output terminal, wherein the second outputting circuit is configured for, when switched on under control of a signal of the second node, writing a signal of the fourth voltage terminal into the output terminal; and
  a second controlling circuit electrically connected to the first node, the second node, a fifth voltage terminal, a second clock-signal terminal and a controlling terminal, wherein the second controlling circuit is configured for, under the control of the signal of the second node, control of a second clock signal and control of a signal of the controlling terminal, when the first outputting circuit is switched on, disconnecting electric connection between the first node and the fifth voltage terminal, and when the second outputting circuit is switched on, writing a signal of the fifth voltage terminal into the first node.

In some embodiments, the shift register further includes a first controlling circuit, the first controlling circuit is electrically connected to the first node, the second node, a fourth node, the second clock-signal terminal and a third voltage terminal, and the first controlling circuit is configured for, under the control of the signal of the second node and the control of the second clock signal of the second clock-signal terminal, writing the second clock signal into the fourth node, and, under the control of the signal of the first node, writing a signal of the third voltage terminal into the fourth node.

In some embodiments, the second controlling circuit includes a first sub-circuit and a second sub-circuit that are connected in series between the fifth voltage terminal and the first node;
  the second sub-circuit is electrically connected to the controlling terminal, and the second sub-circuit is configured for being disconnected when the first outputting circuit is switched on, and being switched on when the second outputting circuit is switched on; and
  the first sub-circuit is electrically connected to the second node and the second clock-signal terminal, and the first sub-circuit is configured for, when switched on under the control of the signal of the second node and the control of the second clock signal of the second clock-signal terminal, cooperating with the second sub-circuit to write the signal of the fifth voltage terminal into the first node.

In some embodiments, the first sub-circuit includes a fourth transistor and a fifth transistor, a control electrode of the fourth transistor is electrically connected to the second clock-signal terminal, and a first electrode of the fourth transistor is electrically connected to the first node; a control electrode of the fifth transistor is electrically connected to the second node, a first electrode of the fifth transistor is electrically connected to a second electrode of the fourth transistor, and a second electrode of the fifth transistor is electrically connected to the fifth voltage terminal; and
  the second sub-circuit is electrically connected between the fourth transistor and the fifth transistor, or between the fourth transistor and the first node, or between the fifth transistor and the fifth voltage terminal.

In some embodiments, the second sub-circuit includes an eleventh transistor, and a control electrode of the eleventh transistor is electrically connected to the controlling terminal; and
  a first electrode of the eleventh transistor is electrically connected to the first node, and a second electrode of the eleventh transistor is electrically connected to the first electrode of the fourth transistor; or
  the first electrode of the eleventh transistor is electrically connected to the second electrode of the fourth transistor, and the second electrode of the eleventh transistor is electrically connected to the first electrode of the fifth transistor; or
  the first electrode of the eleventh transistor is electrically connected to the second electrode of the fifth transistor, and the second electrode of the eleventh transistor is electrically connected to the fifth voltage terminal.

In some embodiments, the controlling terminal is electrically connected to a fourth node.

In some embodiments, the first inputting circuit includes a first transistor, a first electrode of the first transistor is electrically connected to the start-signal terminal, a second electrode of the first transistor is electrically connected to the first node, and a control electrode of the first transistor is electrically connected to the first clock-signal terminal.

In some embodiments, the first outputting circuit includes a tenth transistor, a first electrode of the tenth transistor is electrically connected to the output terminal, a second electrode of the tenth transistor is electrically connected to the first voltage terminal, and a control electrode of the tenth transistor is electrically connected to the first node.

In some embodiments, all of the transistors in the shift register are N-type transistors.

In some embodiments, the first outputting circuit further includes a first capacitor, one of polar plates of the first capacitor is electrically connected to the first node, and the other of the polar plates of the first capacitor is electrically connected to the output terminal.

In some embodiments, the second inputting circuit includes:
- a second transistor, wherein a control electrode of the second transistor is electrically connected to the first node, a first electrode of the second transistor is electrically connected to the second node, and a second electrode of the second transistor is electrically connected to the first clock-signal terminal; and
- a third transistor, wherein a control electrode of the third transistor is electrically connected to the first clock-signal terminal, a first electrode of the third transistor is electrically connected to the second node, and a second electrode of the third transistor is electrically connected to the second voltage terminal.

In some embodiments, the first controlling circuit includes:
- a sixth transistor, wherein a control electrode of the sixth transistor is electrically connected to the second node, a first electrode of the sixth transistor is electrically connected to a fifth node, and a second electrode of the sixth transistor is electrically connected to the second clock-signal terminal;
- a seventh transistor, wherein a control electrode of the seventh transistor is electrically connected to the second clock-signal terminal, a first electrode of the seventh transistor is electrically connected to the fourth node, and a second electrode of the seventh transistor is electrically connected to the fifth node;
- an eighth transistor, wherein a control electrode of the eighth transistor is electrically connected to the first node, a first electrode of the eighth transistor is electrically connected to the fourth node, and a second electrode of the eighth transistor is electrically connected to the third voltage terminal; and
- a second capacitor, wherein one of polar plates of the second capacitor is electrically connected to the first node, and the other of the polar plates of the second capacitor is electrically connected to the fifth node.

In some embodiments, the second outputting circuit includes:
- a ninth transistor, wherein a control electrode of the ninth transistor is electrically connected to the fourth node, a first electrode of the ninth transistor is electrically connected to the output terminal, and a second electrode of the ninth transistor is electrically connected to the fourth voltage terminal; and
- a third capacitor, wherein one of polar plates of the third capacitor is electrically connected to the fourth node, and the other of the polar plates of the third capacitor is electrically connected to the fourth voltage terminal.

In some embodiments, the first voltage terminal and the second voltage terminal are configured to be electrically connected to a same signal terminal.

In some embodiments, a third voltage terminal, the fourth voltage terminal and the fifth voltage terminal are configured to be electrically connected to a same signal terminal.

In another aspect, a scanning driving circuit is provided, wherein the scanning driving circuit includes a plurality of the shift registers stated above, and the plurality of shift registers are cascaded.

In yet another aspect, a displaying device is provided, wherein the displaying device includes a plurality of pixel driving circuits and the scanning driving circuit stated above, each of the pixel driving circuits includes a plurality of transistors, and the output terminals of the shift registers in the scanning driving circuit are electrically connected to the control electrodes of the transistors, to supply an enabling signal.

In still another aspect, a display panel is provided, wherein the display panel includes:
- a substrate;
- a semiconductor layer including a first semiconductor strip and a second semiconductor strip, wherein the first semiconductor strip includes an active layer of a fourth transistor and an active layer of a fifth transistor, and the second semiconductor strip includes an active layer of an eleventh transistor;
- a first electrically conductive layer including a first electrically conductive strip, a second electrically conductive strip and a third electrically conductive strip, wherein the first electrically conductive strip includes a gate electrode of the fourth transistor, the second electrically conductive strip includes a gate electrode of the fifth transistor, a gate electrode of a sixth transistor and one of polar plates of a second capacitor, and the third electrically conductive strip includes a gate electrode of the eleventh transistor, a gate electrode of a ninth transistor and one of polar plates of a third capacitor; and
- a second electrically conductive layer including a first bridging line, wherein the first bridging line is electrically connected to the first semiconductor strip and the second semiconductor strip by a via hole.

In some embodiments, the first semiconductor strip includes a first region and a second region, the first region is the active layer of the fourth transistor, and the second region is the active layer of the fifth transistor; and the first bridging line is connected by the via hole to one end of the first region away from the second region, or the first bridging line is connected by the via hole to one end of the second region away from the first region.

The above description is merely a summary of the technical solutions of the present application. In order to more clearly know the technological means of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are some embodiments of the present application, and a person skilled in the art can obtain other figures according to these figures without paying creative work.

DETAILED DESCRIPTION

In order to make the objects, the technical solutions and the advantages of the embodiments of the present application clearer, the technical solutions of the embodiments of the present application will be clearly and completely described below in combination with the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the circuits according to the embodiments of the present application, a "node" does not refer to a component that actually exists, but refers to a convergence point of the relevant electric connections in the circuit diagram. In other words, the node refers to a node equivalent to the convergence point of the relevant electric connections in the circuit diagram.

Figure 1:
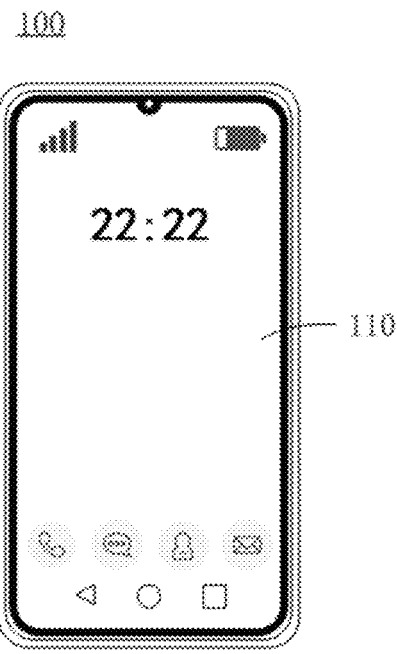
FIG. 1 schematically shows a front structural diagram of a displaying device.

FIG. 1 schematically shows a front structural diagram of a displaying device. As shown in FIG. 1, some embodiments of the present application provide a displaying device 100. The displaying device 100 may be any device that displays a moving (for example, a video) or fixed (for example, a stationary image) text or image. For example, the displaying device 100 may be a mobile phone, a wireless device, a personal data assistant (PDA), a hand-held or portable computer, a GPS receiver/navigator, a camera, an MP4 video player, a video camera, a game console, a watch, a clock, a calculator, a television monitor, a flat-panel display, a computer monitor, a vehicle display (for example, an odometer display and so on), a navigator, a cockpit controller and/or display, a camera view display (for example, the display of a rear view camera of a vehicle), an electronic photograph, an electronic billboard or indicator, a projector, an architectural structure, and a packaging and aesthetics device (for example, a display for the image of a jewel). FIG. 1 is illustrated by taking the case as an example in which the displaying device 100 is a mobile phone.

The displaying device 100 includes a display panel 110. The display panel 110 may be a liquid crystal display panel (which is referred to for short as LCD). The display panel 110 may also be an electroluminescent display panel or a photoluminescent display panel. If the display panel 110 is an electroluminescent display panel, the electroluminescent display panel may be an organic light emitting diode (which is referred to for short as OLED) display panel or a quantum-dot light emitting diode (which is referred to for short as QLED) display panel. If the display panel 110 is a photoluminescent display panel, the photoluminescent displaying device may be a quantum-dot photoluminescent display panel.

Some embodiments of the present application are illustrated by taking the case as an example in which the display panel 110 is an organic light emitting diode (which is referred to for short as OLED) display panel.

Figure 2:
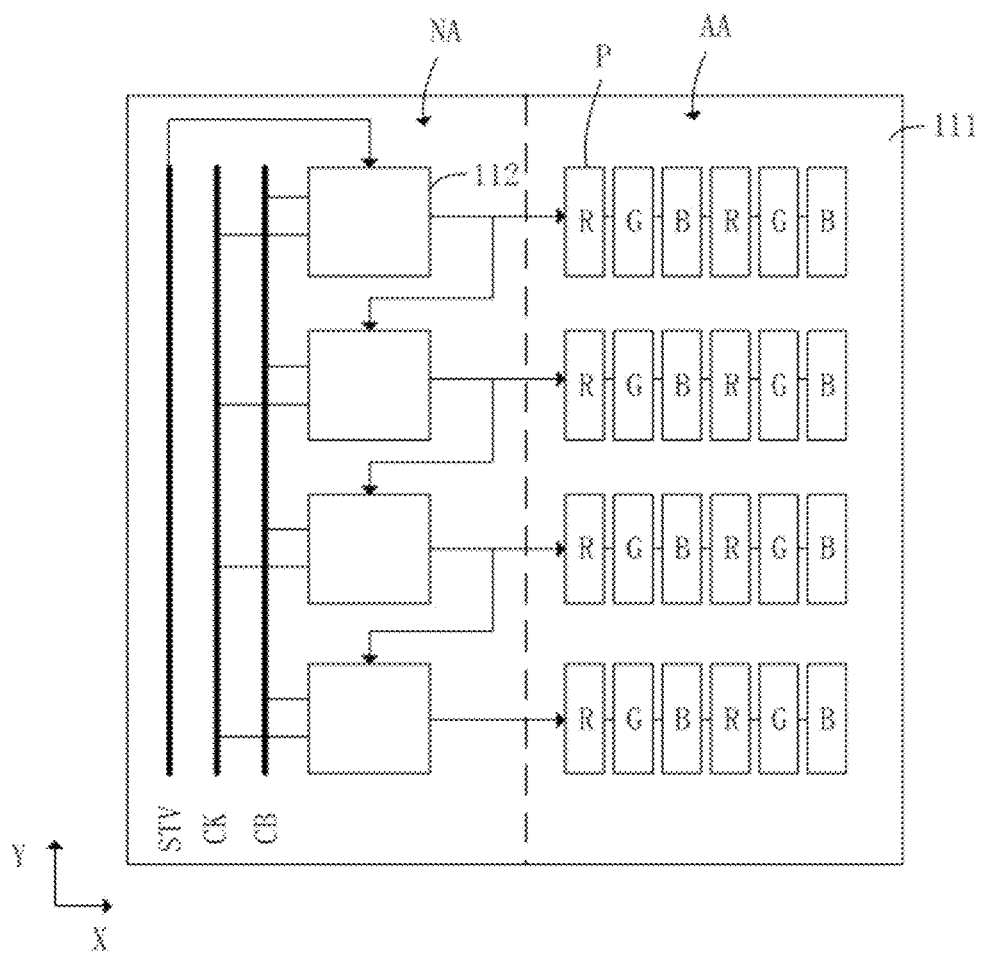
FIG. 2 schematically shows a schematic diagram of a display panel.

FIG. 2 schematically shows a schematic diagram of a display panel. As shown in FIG. 2, the display panel 110 includes a substrate 111, and a plurality of sub-pixels P, a plurality of gate lines and a plurality of data lines that are disposed at one side of the substrate 111.

The substrate 111 may be a rigid substrate, and may also be a flexible substrate, which may be selected and configured according to practical demands.

As an example, the substrate 111 may be a rigid substrate. For example, the rigid substrate may be a glass substrate, a polymethyl methacrylate (PMMA) substrate and so on.

As an example, the substrate 111 may be a flexible substrate. For example, the flexible substrate may be a polyethylene terephthalate (PET) substrate, a polyethylene naphthalate (PEN) substrate, a polyimide (PI) substrate and so on.

The display panel 110 may have an active area AA and a non-active area NA electrically connected to the active area AA. The non-active area NA may be located at one side, two sides or three sides of the active area AA, or the non-active area NA may surround the active area AA. The plurality of sub-pixels P, the plurality of gate lines and the plurality of data lines may be located within the active area AA.

As an example, the plurality of sub-pixels P may be arranged in an array. For example, the plurality of sub-pixels P, when arranged in an array, form a plurality of sub-pixel rows and a plurality of sub-pixel columns, wherein the plurality of sub-pixels P in each of the sub-pixel rows are arranged in a first direction X, and the plurality of sub-pixels P in each of the sub-pixel columns are arranged in a second direction Y.

The first direction X and the second direction Y are intersected with each other. The included angle between the first direction X and the second direction Y may be selected and configured according to practical demands. As an example, the included angle between the first direction X and the second direction Y may be 85°, 88°, 90°, 92°, 95° and so on.

Each of the sub-pixels P may include a pixel driving circuit and a light emitting device electrically connected to the pixel driving circuit. When the display panel 110 is operating, the light emitting device may emit light by the driving of the pixel driving circuit.

Figure 3:
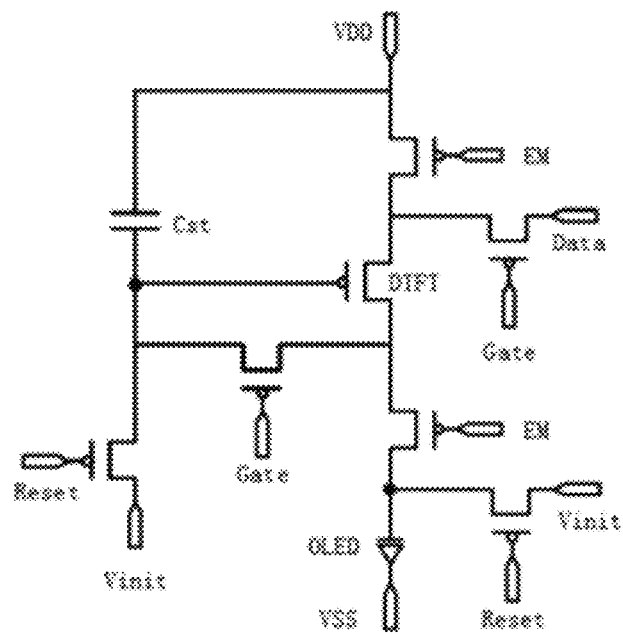
FIG. 3 schematically shows a circuit diagram of a pixel driving circuit.

FIG. 3 schematically shows a circuit diagram of a pixel driving circuit. As shown in FIG. 3, the pixel driving circuit includes a light-emission controlling terminal EM, a data-signal terminal Data, a data-writing controlling terminal Gate and a resetting controlling terminal Reset. The light-emission controlling terminal EM, the data-signal terminal Data, the data-writing controlling terminal Gate and the resetting controlling terminal Reset of the pixel driving circuit may receive signals, and, under the control of the signals, drive the light emitting device OLED to emit light.

FIG. 3 is illustrated by taking the case as an example in which the pixel driving circuit is of the structure of 7T1C. In practical applications, the pixel driving circuit may also be other structures such as 4T1C, 6T1C, 6T2C, 7T2C and 8T2C, and the structure of the pixel driving circuit is not limited in the embodiments of the present application. T represents the transistors, the number preceding T represents the quantity of the transistors, C represents the capacitors, and the number preceding C represents the quantity of the capacitors.

As an example, the plurality of pixel driving circuits in the same sub-pixel column may be electrically connected to the same data line, and the plurality of pixel driving circuits in the same sub-pixel row may be electrically connected to the same gate line. For example, the gate lines include a first gate line, a second gate line and a third gate line, the first gate line is electrically connected to the light-emission controlling terminals EM of the pixel driving circuits in the same sub-pixel row, the second gate line is electrically connected to the data-writing controlling terminals Gate of the pixel driving circuits in the same sub-pixel row, and the third gate line is electrically connected to the resetting controlling terminals Reset of the pixel driving circuits in the same sub-pixel row. The quantity of the gate lines that are electrically connected to the plurality of pixel driving circuits in the same sub-pixel row may be set according to the structures of the pixel driving circuits.

A scanning driving circuit is disposed at one side of the substrate 111. The scanning driving circuit includes a plurality of shift registers 112 that are cascaded. Each of the shift registers 112 includes an output terminal. When the scanning driving circuit is operating, the plurality of cascaded shift registers 112 output controlling signals step by step by using the output terminals. The output terminals of the shift registers 112 may be electrically connected to the gate lines, to cause the shift registers 112 to supply the controlling signals to the pixel driving circuits via the gate lines.

The output terminals of the shift registers 112 may be electrically connected to at least one of the light-emission controlling terminals EM, the data-writing controlling terminals Gate and the resetting controlling terminals Reset of the pixel driving circuits via the gate lines. The embodiments of the present application are illustrated merely by taking the case as an example in which the output terminals of the shift registers 112 are electrically connected to the light-emission controlling terminals EM of the pixel driving circuits via the gate lines.

As an example, the scanning driving circuit is disposed within the non-active area NA. Certainly, in practical applications, in order to reduce the size of the border frame of the display panel 110, at least a part of the scanning driving circuit may also be disposed within the active area AA.

Figure 4:
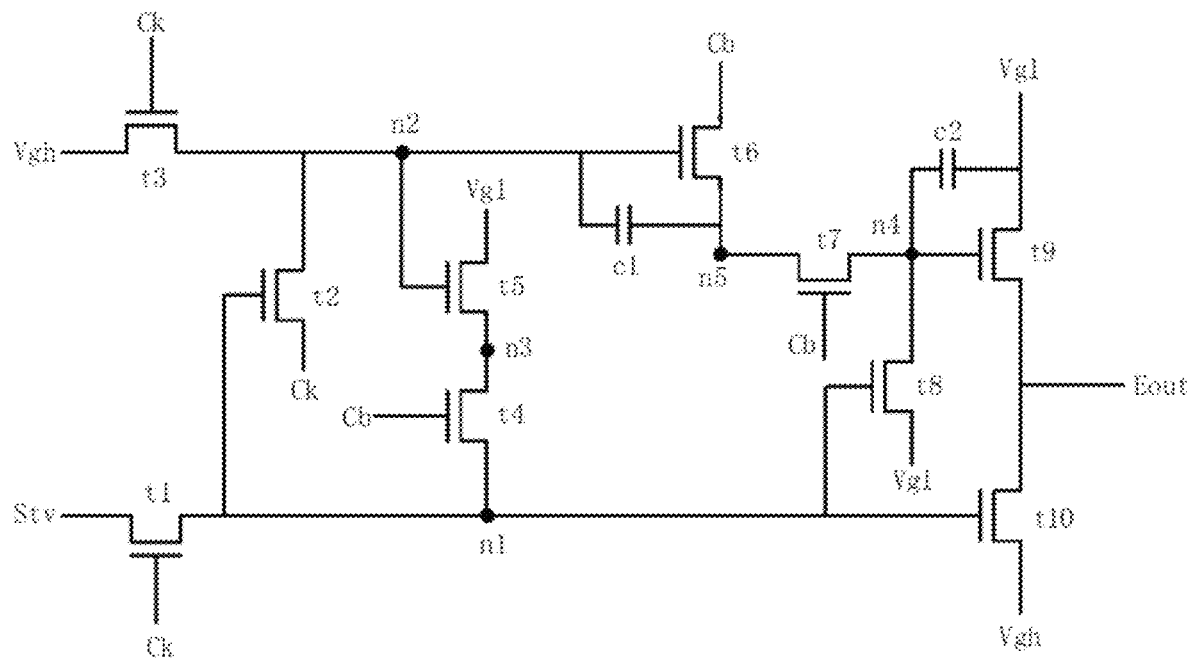
FIG. 4 is a circuit diagram of a shift register in the related art.
Figure 5:
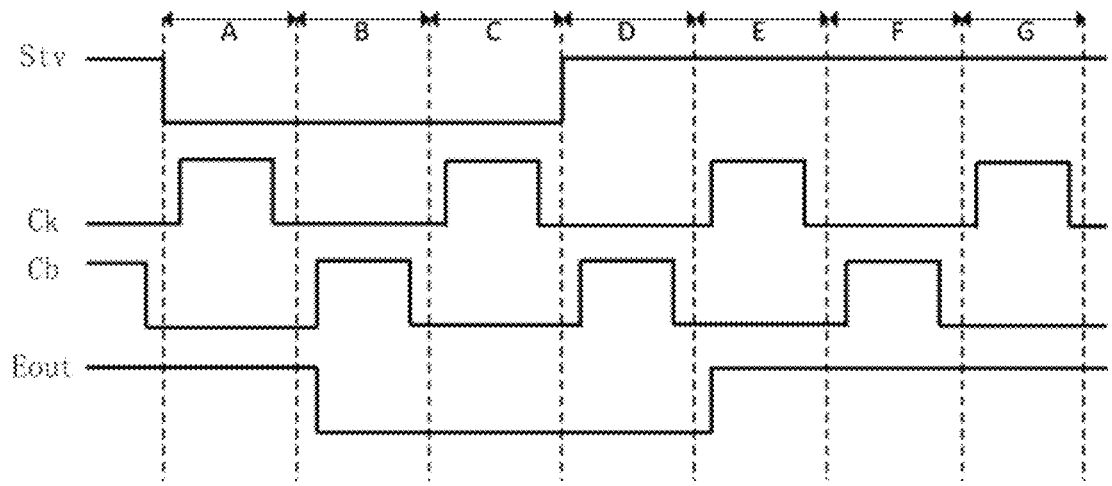
FIG. 5 is an operation sequence diagram of a shift register shown in FIG. 4.
Figure 6:
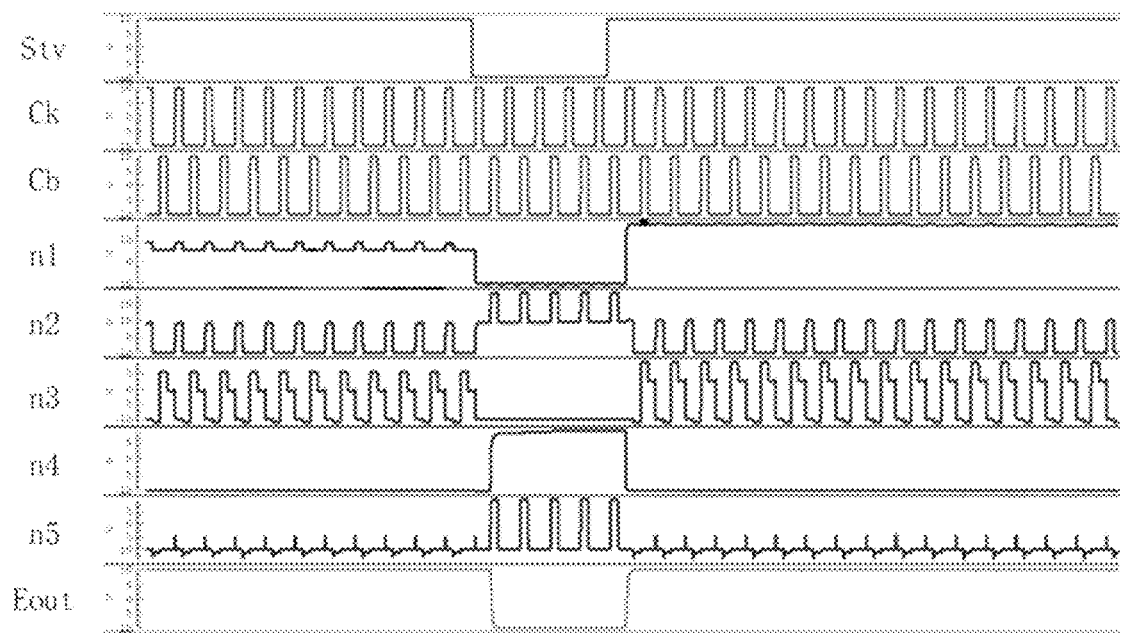
FIG. 6 is potential diagrams of the nodes of the shift register shown in FIG. 4 in the operating process.
Figure 7:
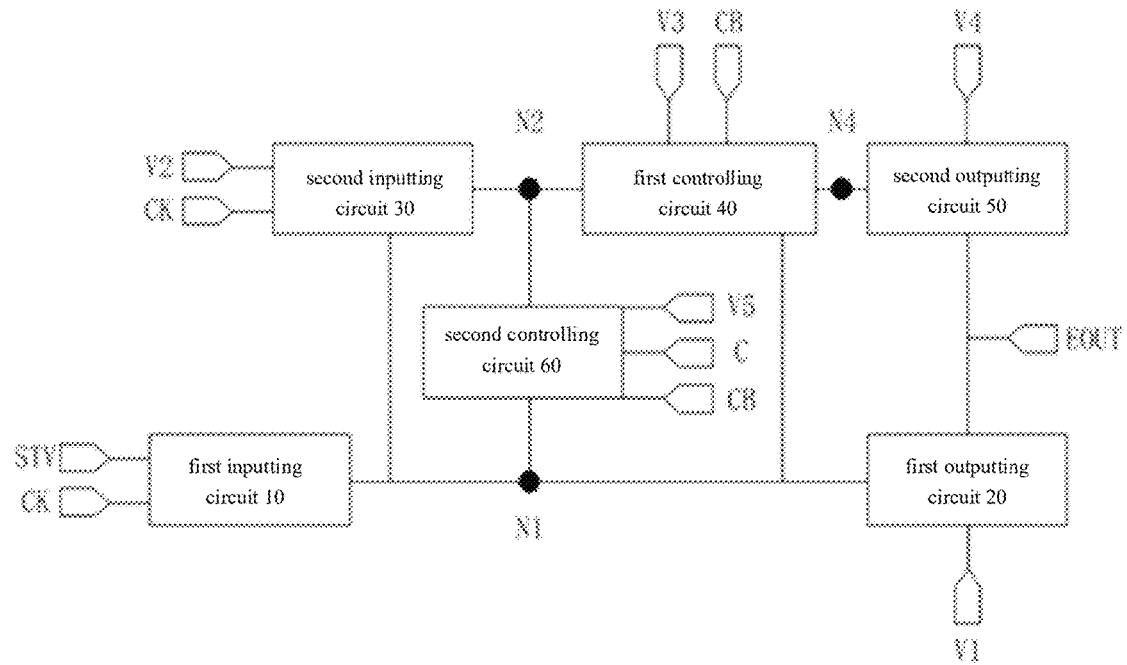
FIG. 7 schematically shows a structural block diagram of a type of the shift register.

FIG. 4 is a circuit diagram of a shift register in the related art. All of the transistors shown in FIG. 4 are N-type transistors. The terminal Vgh is introduced with a high-level signal, and has an electrical level of Vg. The terminal Vgl is introduced with a low-level signal. Both of the threshold voltages of t1 and t10 are Vth. FIG. 5 is an operation sequence diagram of the shift register shown in FIG. 4. The time-sequence signal labeled as Stv is introduced into the terminal Stv in FIG. 4. The time-sequence signal labeled as Ck is introduced into the terminals Ck in FIG. 4. The time-sequence signal labeled as Cb is introduced into the terminals Cb in FIG. 4. The time-sequence signal labeled as Eout is the time-sequence signal outputted by the output terminal EOUT in FIG. 4. Furthermore, when the Stv is a high-level signal, the electrical level of the Stv is equal to the electrical levels of Vg and Vgh. FIG. 6 and FIG. 7 are potential diagrams of the nodes of the shift register shown in FIG. 4 in the operating process.

The operating process of the shift register in the related art will be described in detail below with reference to FIGS. 4 to FIG. 7.

At a stage A, the terminal Stv is introduced with a low-level signal, the terminals Ck are introduced with a high-level signal, and the terminals Cb are introduced with a low-level signal. T1 is turned on under the control of the high-level signal of the terminal Ck, t1 writes the low-level signal of the terminal Stv into the node n1, t2, t8 and t10 are turned off under the control of the low-level signal of the node n1, and the terminal Vgh and the terminal Eout are not switched on with each other. T3 is turned on under the control of the high-level signal of the terminal Ck, t3 writes the high-level signal of the terminal Vgh into the node n2, t5 is turned on under the control of the high-level signal of the node n2, t5 writes the low-level signal of the terminal Vgl into the node n3, t4 is turned off under the control of the low-level signal of the terminal Cb, and the node n3 and the node n1 are not switched on. T6 is turned on under the control of the high-level signal of the node n2, t6 writes the low-level signal of the terminal Cb into the node n5, and at the same time, the capacitor c1 electrically connected between the nodes n2 and n5 is charged. T7 is turned off under the control of the low-level signal of the terminal Cb, to cause the node n4 to be floating. T9 is turned off under the control of the signal of the node n4, and Vgl and Eout are not switched on with each other. Therefore, the terminal Eout is not switched on with the terminal Vgl and the terminal Vhg, and the terminal Eout is floating.

At a stage B, the terminal Stv is introduced with a low-level signal, the terminals Ck are introduced with a low-level signal, and the terminals Cb are introduced with a high-level signal. T1 and t3 are turned off under the control of the low-level signals of the terminals Ck, the terminal Stv and the node n1 are not switched on with each other, and the terminal Vgh and the node n2 are not switched on with each other. The node n2 maintains the high-level signal under the effect of the capacitor c1, t5 is turned on under the control of the high-level signal of the node n2, t4 is turned on under the control of the high-level signal of the terminal Cb, the terminal Vgl and the node n1 are switched on with each other, and the low-level signal of the terminal Vgl is written into the node n1. T2, t8 and t10 are turned off under the control of the low-level signal of the node n1, and the terminal Vgh and the terminal Eout are not switched on with each other. T6 is turned on under the control of the high-level signal of the node n2, t7 is turned on under the control of the high-level signal of the terminal Cb, the terminal Cb and the node n4 are switched on with each other, the high-level signal of the terminal Cb is written into the node n4, and at the same time, the capacitor c2 electrically connected between the terminal Vgl and the node n4 is charged. T9 is turned on under the control of the high-level signal of the node n4, the terminal Vgl and the terminal Eout are switched on with each other, the low-level signal of the terminal Vgl is written into the terminal Eout, and the shift register outputs a low-level signal.

At a stage C, the terminal Stv is introduced with a low-level signal, the terminals Ck are introduced with a high-level signal, and the terminals Cb are introduced with a low-level signal. T1 is turned on under the control of the high-level signal of the terminal Ck, and the low-level signal of the terminal Stv is written into the node n1 via t1. T2, t8 and t10 are turned off under the control of the low-level signal of the node n1, and the terminal Vgh and the terminal Eout are not switched on with each other. T3 is turned on under the control of the high-level signal of the terminal Ck, and the high-level signal of the terminal Vgh is written into the node n2 via t3. T5 is turned on under the control of the high-level signal of the node n2, t5 writes the low-level signal of the terminal Vgl into the node n3, t4 is turned off under the control of the low-level signal of the terminal Cb, and the node n3 and the node n1 are not switched on. T6 is turned on under the control of the high-level signal of the node n2, the low-level signal of the terminal Cb is written into the node n5 via t6, and at the same time, the capacitor c1 electrically connected between the nodes n2 and n5 is charged. T7 is turned off under the control of the low-level signal of the terminal Cb, and the node n5 and the node n4 are not switched on with each other. The node n4 maintains the high-level signal under the effect of the capacitor c2, t9 is turned on under the control of the high-level signal of the node n4, the terminal Vgl and the terminal Eout are switched on with each other, and the shift register outputs a low-level signal via the terminal Eout.

At a stage D, the terminal Stv is introduced with a high-level signal, the terminals Ck are introduced with a low-level signal, and the terminals Cb are introduced with a high-level signal. T1 and t3 are turned off under the control of the low-level signals of the terminals Ck. The node n2 maintains the high-level signal under the effect of the capacitor c1, t5 is turned on under the control of the high-level signal of the node n2, t4 is turned on under the control of the high-level signal of the terminal Cb, the terminal Vgl and the node n1 are switched on with each other, and the low-level signal of the terminal Vgl is written into the node n1. T2, t8 and t10 are turned off under the control of the low-level signal of the node n1, and the terminal Vgh and the terminal Eout are not switched on with each other. T6 is turned on under the control of the high-level signal of the node n2, t7 is turned on under the control of the high-level signal of the terminal Cb, the terminal Cb and the node n4 are switched on with each other, and the high-level signal of the terminal Cb is written into the node n4. T9 is turned on under the control of the high-level signal of the node n4, the terminal Vgl and the terminal Eout are switched on with each other, the low-level signal of the terminal Vgl is written into the terminal Eout, and the shift register outputs a low-level signal via the terminal Eout.

At a stage E, the terminal Stv is introduced with a high-level signal, the terminals Ck are introduced with a high-level signal, and the terminals Cb are introduced with a low-level signal. T1 is turned on under the control of the high-level signal of the terminal Ck, and the high-level signal of the terminal Stv is written into the node n1 via t1. Because of the transistor characteristics of the transistor t1, the voltage of the node n1 is the voltage Vh of the terminal Stv minus the threshold voltage Vth of t1; in other words, the voltage of the node n1 is Vh–Vth. T10 is turned on under the control of the high-level signal of the node n1, the terminal Vgh and the terminal Eout are switched on with each other, and the high-level signal of the terminal Vgh is written into the terminal Eout. Furthermore, because t10 itself forms a capacitor Cgs, and Cgs is equivalent to that one of the polar plates is electrically connected to the node n1, and the other of the polar plates is electrically connected to the terminal Eout, when the high-level signal of the terminal Vgh is written into the terminal Eout, the electrical level of the terminal Eout increases, and, under the coupling effect of the capacitor Cgs, the electrical level of the node n1, after increasing, is greater than the electrical level of the terminal Stv. At the same time, t3 is turned on under the control of the high-level signal of the terminal Ck, and the high-level signal of the terminal Vgh is written into the node n2. T5 is turned on under the control of the high-level signal of the node n2, the low-level signal of the terminal Vgl is written into the node n3 via t5, t4 is turned off under the control of the low-level signal of the terminal Cb, and the node n3 and the node n1 are not switched on with each other. T6 is turned on under the control of the high-level signal of the node n2, the low-level signal of the terminal Cb is written into the node n5 via t6, and at the same time, the capacitor c1 is charged. T7 is turned off under the control of the low-level signal of the terminal Cb, and the node n5 and the node n4 are not switched on with each other. T8 is turned on under the control of the high-level signal of the node n1, the low-level signal of the terminal Vgl is written into the node n4 via t8, 19 is turned off under the control of the low-level signal of the node n4, and the terminal Vgl and the terminal Eout are not switched on with each other. The shift register outputs a high-level signal via the terminal Eout.

At a stage F, the terminal Stv is introduced with a high-level signal, the terminals Ck are introduced with a low-level signal, and the terminals Cb are introduced with a high-level signal. T1 and t3 are turned off under the control of the low-level signals of the terminals Ck. T4 is turned on under the control of the high-level signal of the terminal Cb, the node n1 and the node n3 are switched on, and a part of the electric charges of the node n1 are written into the node n3, so that the electrical level of the node n1 decreases. Because t10 itself forms a capacitor Cgs, under the effect of the capacitor Cgs, the node n1 maintains the high-level signal. T2 is turned on under the control of the high-level signal of the node n1, the low-level signal of the terminal Ck is written into the node n2 via t2, t5 is turned off under the control of the low-level signal of the node n2, and the node n3 and the terminal Vgl are not switched on with each other.

Because the node n3 and the terminal Vgl are not switched on with each other, the electric charges of the node n3 are not released to the terminal Vgl, so that the electrical level of the node n1 are not decreased continuously, the high-level signal of the node n1 can still control t10 to be turned on, and the high-level signal of the terminal Vgh is written into the terminal Eout via t10. At the same time, t8 is turned on under the control of the high-level signal of the node n1, the low-level signal of the terminal Vgl is written into the node n4 via t8, 19 is turned off under the control of the low-level signal of the node n4, and the terminal Vgl and the terminal Eout are not switched on with each other. The shift register outputs a high-level signal via the terminal Eout.

At a stage G, the terminal Stv is introduced with a high-level signal, the terminals Ck are introduced with a high-level signal, and the terminals Cb are introduced with a low-level signal. As compared with the stage E, because, at the stage G, the electrical level of the node n1 is greater than the electrical level of the terminal Stv, the source electrode of t1 is electrically connected to the terminal Stv, and the drain electrode of t1 is electrically connected to the node n1. At this moment, the Vgs of t1 is the high-level signal of the terminal Ck minus the high-level signal of the terminal Stv, which is less than the threshold voltage of t1 (for example, the high-level signal of the terminal Ck is equal to the high-level signal of the terminal Stv, and Vgs is equal to 0), t1 is turned off, and the terminal Stv and the node n1 are not switched on with each other. Furthermore, t3 is turned on under the control of the high-level signal of the terminal Ck, the high-level signal of the terminal Vgh is written into the node n2 via t3, t5 is turned on under the control of the high-level signal of the node n2, the terminal Vgl and the node n3 are switched on with each other, and the electric charges written by the node n3 at the stage F are released via the terminal Vgl.

In a displaying frame of the display panel, the stage F and the stage G are alternately performed. At the stage F, a part of the electric charges of the node n1 are written into the node n3, so that the electric potential of the node n1 is reduced. At the stage G, the node n3 and the terminal Vgl are switched on, to cause the electric charges written by the node n3 to be released to the terminal Vgl. When the stage F and the stage G are alternately performed, the electric potential of the node n1 is caused to continuously decrease. In other words, each time the stage F and the stage G alternately happen one time, the electric potential of the node n1 decreases one time.

If the shift register is required to stably output the high-level signal Vg via the terminal Eout, then the electric potential of the node n1 is required to be greater than the sum of Vg and the threshold voltage Vth of t10. When the stage F and the stage G are alternately performed, the electric potential of the node n1 is caused to continuously decreases, and caused that the electric potential of the node n1 is less than the sum of Vg and the threshold voltage Vth of t10, t10 is easily turned off, so that the terminal Eout is floating. Therefore, the output of the shift register easily has defects caused by other signal disturbances.

Furthermore, even if t1 is turned on to cause the terminal Stv and the node n1 to be switched on and compensate the electric potential of the node n1, because of the transistor characteristics of the transistor t1, the compensated electric potential of the node n1 is equal to the high-level signal Vg of the terminal Stv minus the threshold voltage Vth of t1; in other words, the electric potential of the node n1 is Vg−Vth, which is still less than Vg+Vth, which still cannot ensure that t10 is turned on.

In order to solve the above problem, some embodiments of the present application provide a shift register, which can prevent the problem of the turning-off of t10 and the floating of the output terminal caused by the decreasing of the electric potential of the control electrode of the transistor t10.

Figure 8:
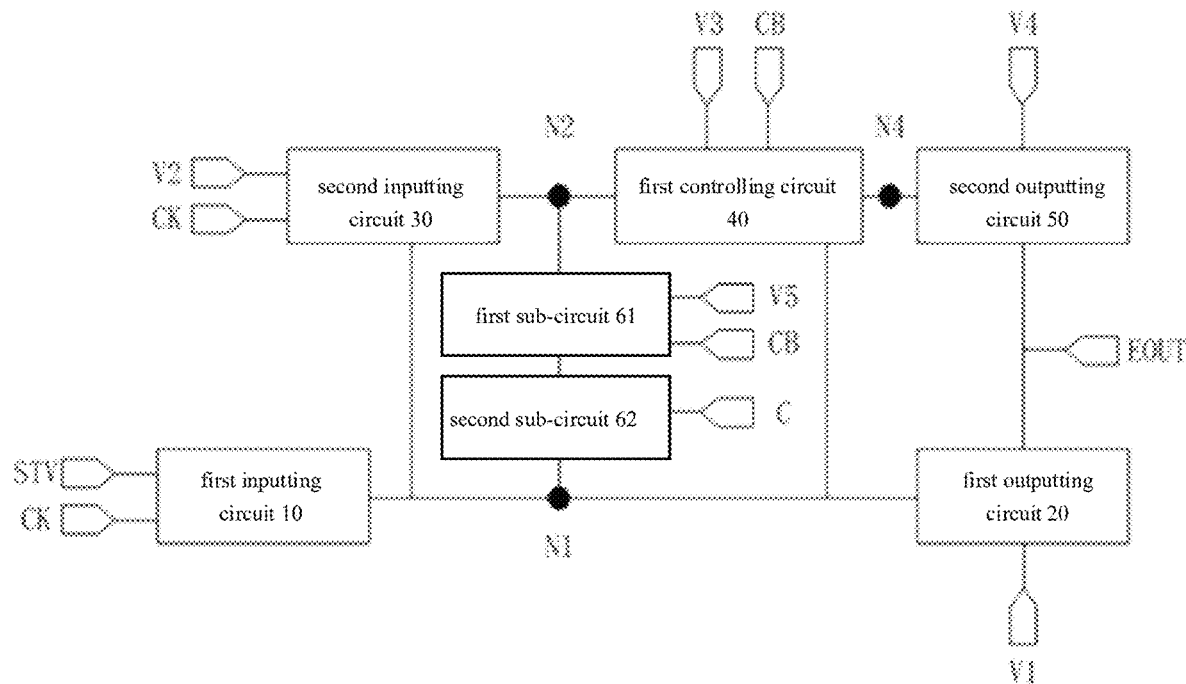
FIG. 8 schematically shows a structural block diagram of another type of the shift register.

FIG. 8 schematically shows a structural block diagram of a type of the shift register. As shown in FIG. 8, the shift register includes a first inputting circuit 10, a first outputting circuit 20, a second inputting circuit 30, a second outputting circuit 50 and a second controlling circuit 60.

The first inputting circuit 10 is electrically connected to a start-signal terminal STV, a first node N1 and a first clock-signal terminal CK. The first inputting circuit 10 is configured for, under the control of a first clock signal of the first clock-signal terminal CK, writing the signal of the start-signal terminal STV into the first node N1.

For example, when the first clock signal is a high-level signal, the first inputting circuit 10 is switched on, and the signal of the start-signal terminal STV is written into the first node N1 via the first inputting circuit 10. At this moment, if the signal of the start-signal terminal STV is a high-level signal, the first node N1 is a high-level signal, and if the signal of the start-signal terminal STV is a low-level signal, the first node N1 is a low-level signal.

In practical applications, the scanning driving circuit may further include a start-signal line, and the start-signal line may be electrically connected to the start-signal terminal STV, to cause the start-signal terminal STV to acquire the start signal in the start-signal line.

As an example, when the scanning driving circuit includes a plurality of shift registers that are cascaded, the start-signal terminal STV of the first shift register is electrically connected to the start-signal line, and the start-signal terminal STV of the next one shift register is electrically connected to the output terminal EOUT of the preceding one shift register.

As an example, the scanning driving circuit may further include a plurality of clock-signal lines, and the first clock-signal terminal CK is electrically connected to one of the clock-signal lines, to acquire the first clock signal in the clock-signal line.

The first outputting circuit 20 is electrically connected to the first node N1, an output terminal EOUT and a first voltage terminal V1. The first outputting circuit 20 is configured for, when switched on under the control of the signal of the first node N1, writing the signal of the first voltage terminal V1 into the output terminal EOUT.

For example, when the signal of the first node N1 is a high-level signal, the first outputting circuit 20 is switched on, and the signal of the first voltage terminal V1 is written into the output terminal EOUT via the first outputting circuit 20. When the signal of the first node N1 is a low-level signal, the first outputting circuit 20 is not switched on, and the first voltage terminal V1 and the output terminal EOUT are not electrically connected to each other.

The output terminal EOUT is used to be electrically connected to a gate line GL. The first voltage terminal V1 may be introduced with a constant high-level signal.

The second inputting circuit 30 is electrically connected to the first node N1, a second node N2, a second voltage terminal V2 and the first clock-signal terminal CK. The second inputting circuit 30 is configured for, under the control of the signal of the first node N1, writing the first clock signal into the second node N2, and, under the control of the first clock signal, writing the signal of the second voltage terminal V2 into the second node N2.

For example, when the signal of the first node N1 is a high-level signal, the second inputting circuit 30 is switched on, and the first clock signal is written into the second node N2 via the second inputting circuit 30. When the first clock signal is a high-level signal, the second inputting circuit 30 is switched on, and the signal of the second voltage terminal V2 is written into the second node N2 via the second inputting circuit 30.

The second voltage terminal V2 may be introduced with a constant high-level signal. As an example, the first voltage terminal V1 and the second voltage terminal V2 are electrically connected to the same signal terminal, to cause the first voltage terminal V1 and the second voltage terminal V2 to be introduced with the same high-level signal.

The second outputting circuit 50 is electrically connected to a fourth voltage terminal V4, the second node N2 and the output terminal EOUT. The second outputting circuit 50 is configured for, when switched on under the control of the signal of the second node N2, writing the signal of the fourth voltage terminal V4 into the output terminal EOUT.

The fourth voltage terminal V4 may be introduced with a constant low-level signal. As an example, the fourth voltage terminal V4 and the third voltage terminal V3 may be electrically connected to the same signal terminal, so that the fourth voltage terminal V4 and the third voltage terminal V3 can be introduced with the same low-level signal. For example, the substrate is further provided with a VGL line, a constant low-level signal is introduced in the VGL line, and both of the fourth voltage terminal V4 and the third voltage terminal V3 are electrically connected to the VGL line at the same time.

The second controlling circuit 60 is electrically connected to the first node N1, the second node N2, a fifth voltage terminal V5, a second clock-signal terminal CB and a controlling terminal C. The second controlling circuit 60 is configured for, under the control of the signal of the second node N2, the control of a second clock signal and the control of the signal of the controlling terminal C, when the first outputting circuit 20 is switched on, disconnecting the electric connection between the first node N1 and the fifth voltage terminal V5, and when the second outputting circuit 50 is switched on, writing the signal of the fifth voltage terminal V5 into the first node N1.

For example, when the signal of the controlling terminal C is a low-level signal, the second controlling circuit 60 is not switched on, so that the first node N1 and the fifth voltage terminal V5 are not switched on with each other. When all of the signal of the controlling terminal C, the signal of the second node N2 and the second clock signal are high-level signals, the second controlling circuit 60 is switched on, and the signal of the fifth voltage terminal V5 is written into the first node N1 via the second controlling circuit 60.

The fifth voltage terminal V5 may be introduced with a constant low-level signal. As an example, the fifth voltage terminal V5, the fourth voltage terminal V4 and the third voltage terminal V3 may be electrically connected to the same signal terminal. For example, all of the fifth voltage terminal V5, the fourth voltage terminal V4 and the third voltage terminal V3 are electrically connected to the VGL line.

In the shift register according to the embodiments of the present application, when the first outputting circuit 20 is switched on, the electric connection between the first node N1 and the fifth voltage terminal V5 can be disconnected by using the second controlling circuit 60, thus the electric charges of the first node N1 is prevented from being released to the fifth voltage terminal V5, that is, that the first outputting circuit 20 cannot be continuously switched on due to electric-potential decreasing of the first node N1 is prevented.

The shift register may further include a first controlling circuit 40. The first controlling circuit 40 is electrically connected to the first node N1, the second node N2, a fourth node N4, the second clock-signal terminal CB and a third voltage terminal V3. The first controlling circuit 40 is configured for, under the control of the signal of the second node N2 and the control of the second clock signal of the second clock-signal terminal CB, writing the second clock signal into the fourth node N4, and, under the control of the signal of the first node N1, writing the signal of the third voltage terminal V3 into the fourth node N4.

For example, when the signal of the second node N2 and the second clock signal are a high-level signal at the same time, the first controlling circuit 40 is switched on, and the second clock signal is written into the fourth node N4 via the first controlling circuit 40. When the signal of the first node N1 is a high-level signal, the first controlling circuit 40 is switched on, and the signal of the third voltage terminal V3 is written into the fourth node N4 via the first controlling circuit 40.

The third voltage terminal V3 may be introduced with a constant low-level signal.

Figure 9:
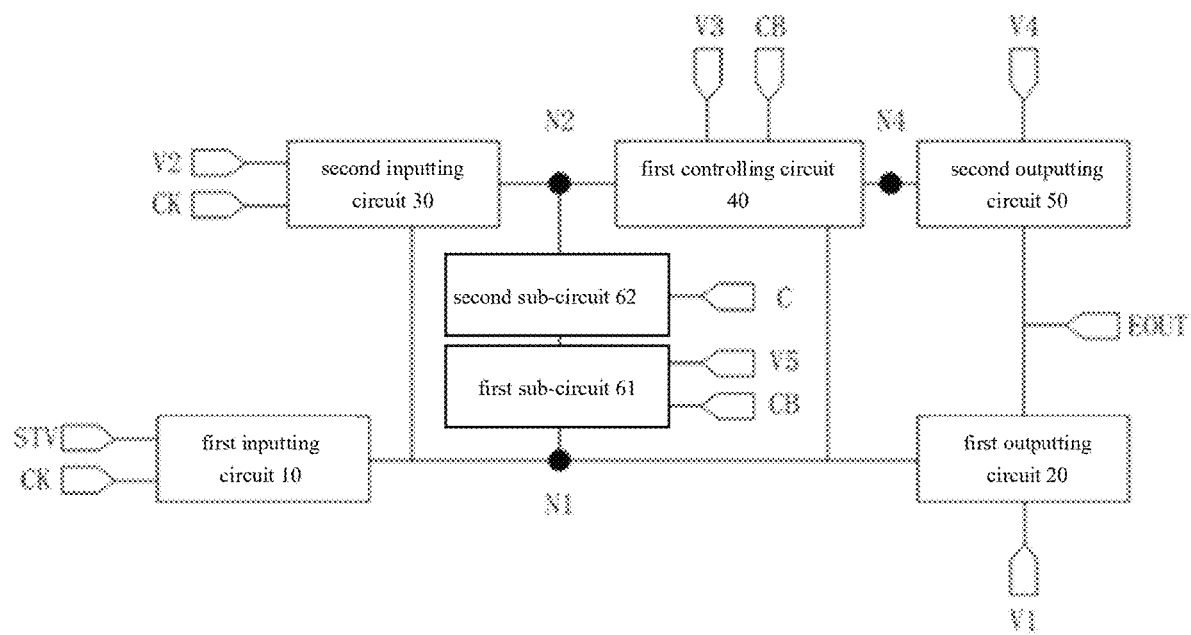
FIG. 9 schematically shows a structural block diagram of yet another type of the shift register.
Figure 10:
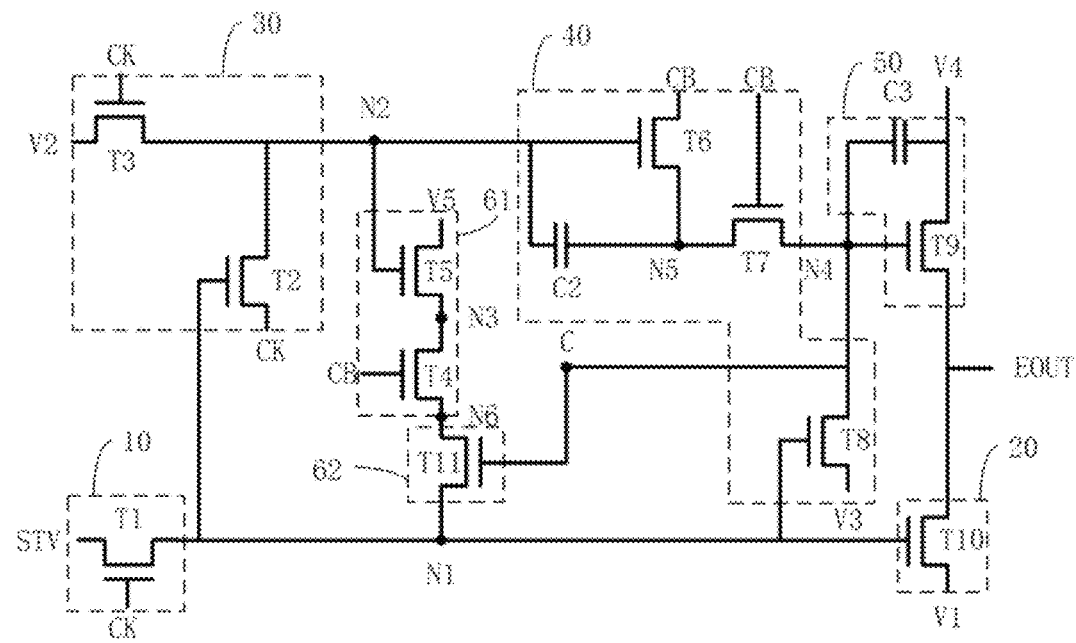
FIG. 10 schematically shows a circuit diagram of a type of the shift register.

FIG. 9 schematically shows a structural block diagram of another type of the shift register. FIG. 10 schematically shows a structural block diagram of yet another type of the shift register. As shown in FIG. 9 and FIG. 10, the second controlling circuit 60 may include a first sub-circuit 61 and a second sub-circuit 62 that are connected in series between the fifth voltage terminal V5 and the first node N1.

The second sub-circuit 62 is configured for being disconnected when the first outputting circuit 20 is switched on, and being switched on when the second outputting circuit 50 is switched on. The first sub-circuit 61 is electrically connected to the second node N2 and the second clock-signal terminal CB. The first sub-circuit 61 is configured for, when switched on under the control of the signal of the second node N2 and the control of the second clock signal, cooperating with the second sub-circuit 62, to write the signal of the fifth voltage terminal V5 into the first node N1.

For example, when the signal of the second node N2 and the second clock signal are a high-level signal at the same time, the first sub-circuit 61 is switched on, and when the second outputting circuit 50 is switched on, the second sub-circuit 62 is switched on. The first sub-circuit 61 and the second sub-circuit 62 are switched on at the same time, so that the signal of the fifth voltage terminal V5 is written into the first node N1 via the first sub-circuit 61 and the second sub-circuit 62. When the first outputting circuit 20 is switched on, the second sub-circuit 62 is disconnected, so that the fifth voltage terminal V5 and the first node N1 are disconnected from each other.

That the first sub-circuit 61 and the second sub-circuit 62 are connected in series between the fifth voltage terminal V5 and the first node N1 refers to that, when both of the first sub-circuit 61 and the second sub-circuit 62 are switched on, the fifth voltage terminal V5 and the first node N1 are switched on with each other, and when the second sub-circuit 62 is not switched on, the fifth voltage terminal V5 and the first node N1 are not switched on with each other.

As an example, the first sub-circuit 61 and the second sub-circuit 62 may be connected in series between the fifth voltage terminal V5 and the first node N1 in the mode shown in FIG. 9, wherein the second sub-circuit 62 is located between the first sub-circuit 61 and the first node.

As an example, the first sub-circuit 61 and the second sub-circuit 62 may be connected in series between the fifth voltage terminal V5 and the first node N1 in the mode shown in FIG. 10, wherein the first sub-circuit 61 is located between the second sub-circuit 62 and the first node.

Certainly, the first sub-circuit 61 and the second sub-circuit 62 may also be connected in series in other modes, as long as, when the second sub-circuit 62 is not switched on, the fifth voltage terminal V5 and the first node N1 are not switched on with each other. For example, the second sub-circuit 62 is located inside the first sub-circuit 61, and when the second sub-circuit 62 is not switched on, that causes that the first sub-circuit 61 is not switched on.

By disposing the second sub-circuit 62 in the second controlling circuit 60, and configuring that the second sub-circuit 62 is not switched on when the first outputting circuit 20 is switched on, in the process of the switching-on of the first outputting circuit 20, the electric charges of the first node N1 are no released to the fifth voltage terminal via the first sub-circuit 61, so that the first outputting circuit 20 can maintain the conducting state, the appearing of outputting defects of the output terminal EOUT is prevented.

Figure 11:
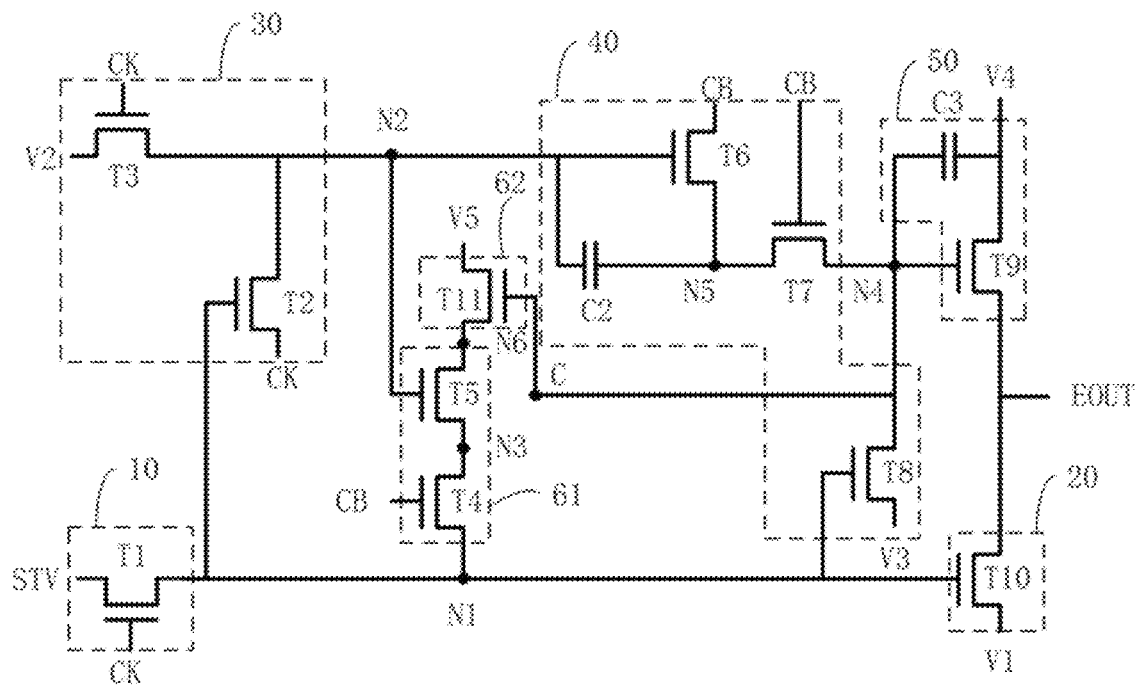
FIG. 11 schematically shows a circuit diagram of another type of the shift register.
Figure 12:
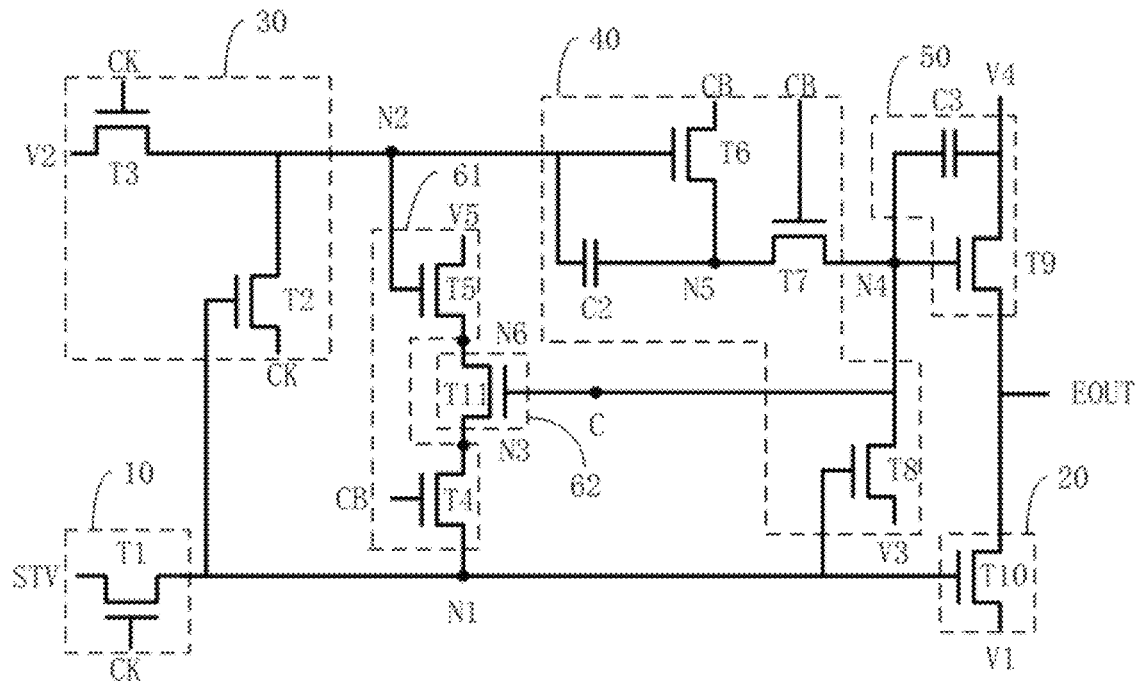
FIG. 12 schematically shows a circuit diagram of yet another type of the shift register.
Figure 13:
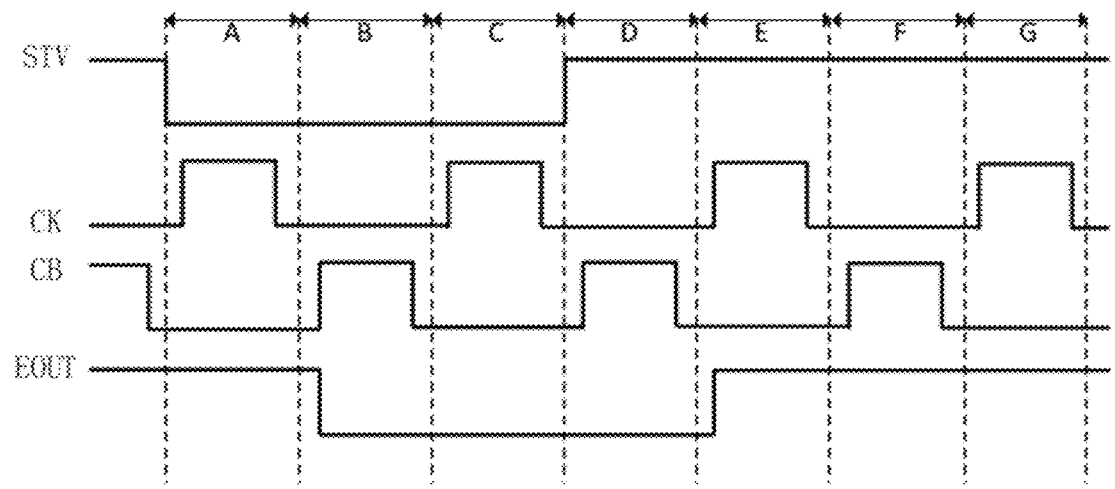
FIG. 13 schematically shows sequence diagrams of the signal terminals in the shift register shown in FIG. 10 to FIG. 12.

FIG. 11 schematically shows a circuit diagram of a type of the shift register. FIG. 12 schematically shows a circuit diagram of another type of the shift register. FIG. 13 schematically shows a circuit diagram of yet another type of the shift register. As shown in FIG. 11 to FIG. 13, the shift register includes a plurality of transistors, the first electrode of each of the transistors refers to one of the source electrode and the drain electrode of the transistor, and the second electrode refers to the other of the source electrode and the drain electrode of the transistor.

Because the source electrode and the drain electrode of a transistor may be symmetrical in the structures, the source electrode and the drain electrode of the transistor may be not different in the structures; in other words, the first electrode and the second electrode of the transistors according to the embodiments of the present application may be not different in the structures. The control electrode of each of the transistors may be the gate electrode of the transistor, and the gate electrode is used to control the turning-on or turning-off of the transistor. The shift register according to some embodiments of the present application is illustrated merely by taking the case as an example in which all of the transistors are N-type transistors.

As shown in FIG. 11 to FIG. 13, the first sub-circuit 61 may include a fourth transistor T4 and a fifth transistor T5, the control electrode of the fourth transistor T4 is electrically connected to the second clock-signal terminal CB, and the first electrode of the fourth transistor T4 is electrically connected to the first node N1. The control electrode of the fifth transistor T5 is electrically connected to the second node N2, the first electrode of the fifth transistor T5 is electrically connected to the second electrode of the fourth transistor T4, and the second electrode of the fifth transistor T5 is electrically connected to the fifth voltage terminal V5.

The first electrode of the fifth transistor T5 and the second electrode of the fourth transistor T4 may be electrically connected directly, and may also be electrically connected via the second sub-circuit 62. When the first electrode of the fifth transistor T5 and the second electrode of the fourth transistor T4 are electrically connected directly, the second sub-circuit 62 may be electrically connected between the fifth transistor T5 and the fifth voltage terminal V5, or electrically connected between the fourth transistor T4 and the first node N1. When the first electrode of the fifth transistor T5 and the second electrode of the fourth transistor T4 are electrically connected via the second sub-circuit 62, the first electrode of the fifth transistor T5 is electrically connected to the second sub-circuit 62, and the second electrode of the fourth transistor T4 is electrically connected to the second sub-circuit 62.

For example, when the first outputting circuit 20 is switched on, the second sub-circuit 62 is not switched on, so that the fifth voltage terminal V5 and the first node N1 are not switched on with each other, and the electric charges of the node N1 are not released to the fifth voltage terminal V5. In other words, the electric potential of the node N1 does not decrease continuously, so that the first outputting circuit 20 can be continuously switched on under the control of the signal of the first node N1, the appearing of outputting defects of the output terminal EOUT is prevented.

Referring continuously to FIG. 11 to FIG. 13, the second sub-circuit 62 may include an eleventh transistor T11, and the control electrode of the eleventh transistor T11 is electrically connected to the controlling terminal C, to control the turning-on or turning-off of the eleventh transistor T11 by using the signal of the controlling terminal C.

As an example, as shown in FIG. 11, the first electrode of the eleventh transistor T11 is electrically connected to the first node N1, and the second electrode of the eleventh transistor T11 is electrically connected to the first electrode of the fourth transistor T4.

As an example, as shown in FIG. 12, the first electrode of the eleventh transistor T11 is electrically connected to the second electrode of the fifth transistor T5, and the second electrode of the eleventh transistor T1 is electrically connected to the fifth voltage terminal V5.

As an example, as shown in FIG. 13, the first electrode of the eleventh transistor T11 is electrically connected to the second electrode of the fourth transistor T4, and the second electrode of the eleventh transistor T11 is electrically connected to the first electrode of the fifth transistor T5.

For example, when the first outputting circuit 20 is switched on, the signal of the controlling terminal C is a low-level signal, and the eleventh transistor T11 is turned off. At this moment, the fifth voltage terminal V5 and the first node N1 are not switched on with each other, and the electric charges of the node N1 are not released to the fifth voltage terminal V5. In other words, the electric potential of the node N1 does not decrease continuously, so that the first outputting circuit 20 can be continuously switched on under the control of the signal of the first node N1, the appearing of outputting defects of the output terminal EOUT is prevented.

The controlling terminal C may be electrically connected to the fourth node N4. In other words, the control electrode of the eleventh transistor T11 is electrically connected to the fourth node N4. When the signal of the fourth node N4 is a low-level signal, the eleventh transistor T11 is turned off. When the signal of the fourth node N4 is a high-level signal, the eleventh transistor T11 is turned on.

The first inputting circuit 10 may include a first transistor T1, the first electrode of the first transistor T1 is electrically connected to the start-signal terminal STV, the second electrode of the first transistor T1 is electrically connected to the first node N1, and the control electrode of the first transistor T1 is electrically connected to the first clock-signal terminal CK.

For example, when the first clock signal is a high-level signal, the first transistor T1 is turned on, the signal of the start-signal terminal STV is written into the first node N1 via the first transistor T1.

The first outputting circuit 20 may include a tenth transistor T10, the first electrode of the tenth transistor T10 is electrically connected to the output terminal EOUT, the second electrode of the tenth transistor T10 is electrically connected to the first voltage terminal V1, and the control electrode of the tenth transistor T10 is electrically connected to the first node N1.

For example, when the signal of the first node N1 is a high-level signal, the tenth transistor T10 is turned on, and the signal of the first voltage terminal V1 is written into the output terminal EOUT via the tenth transistor T10.

The first outputting circuit 20 may further include a first capacitor, one of the polar plates of the first capacitor is electrically connected to the first node N1, and the other of the polar plates of the first capacitor is electrically connected to the output terminal EOUT. When the first node N1 is connected to the start-signal terminal STV and is written with a high-level signal, the first capacitor can be charged at the same time. When the first node N1 is disconnected from the start-signal terminal STV, the first node N1 can maintain the high-level signal under the effect of the first capacitor. Furthermore, when the output terminal EOUT is written with the high-level signal, under the coupling effect of the first capacitor, the electric potential of the first node N1 can be increased.

The second inputting circuit 30 may include a second transistor T2 and a third transistor T3.

The control electrode of the second transistor T2 is electrically connected to the first node N1, the first electrode of the second transistor T2 is electrically connected to the second node N2, and the second electrode of the second transistor T2 is electrically connected to the first clock-signal terminal CK. The control electrode of the third transistor T3 is electrically connected to the first clock-signal terminal CK, the first electrode of the third transistor T3 is electrically connected to the second node N2, and the second electrode of the third transistor T3 is electrically connected to the second voltage terminal V2.

For example, when the signal of the first node N1 is a high-level signal, the second transistor T2 is turned on, and the first clock signal is written into the second node N2 via the second transistor T2. When the first clock signal is a high-level signal, the third transistor T3 is turned on, and the signal of the second voltage terminal V2 is written into the second node N2 via the third transistor T3.

The first controlling circuit 40 may include a sixth transistor T6, a seventh transistor T7, an eighth transistor T8 and a second capacitor C2.

The control electrode of the sixth transistor T6 is electrically connected to the second node N2, the first electrode of the sixth transistor T6 is electrically connected to a fifth node N5, and the second electrode of the sixth transistor T6 is electrically connected to the second clock-signal terminal CB. The control electrode of the seventh transistor T7 is electrically connected to the second clock-signal terminal CB, the first electrode of the seventh transistor T7 is electrically connected to the fourth node N4, and the second electrode of the seventh transistor T7 is electrically connected to the fifth node N5. The control electrode of the eighth transistor T8 is electrically connected to the first node N1, the first electrode of the eighth transistor T8 is electrically connected to the fourth node N4, and the second electrode of the eighth transistor T8 is electrically connected to the third voltage terminal V3. One of the polar plates of the second capacitor C2 is electrically connected to the first node N1, and the other of the polar plates is electrically connected to the fifth node N5.

For example, when the signal of the second node N2 and the second clock signal are high-level signals at the same time, the sixth transistor T6 and the seventh transistor T7 are turned on, and the second clock signal is written into the fourth node N4 via the sixth transistor and the seventh transistor. When the signal of the first node N1 is a high-level signal, the eighth transistor T8 is turned on, and the low-level signal of the third voltage terminal V3 is written into the fourth node N4 via the eighth transistor.

The second outputting circuit 50 may include a ninth transistor T9 and a third capacitor C3.

The control electrode of the ninth transistor T9 is electrically connected to the fourth node N4, the first electrode of the ninth transistor T9 is electrically connected to the output terminal EOUT, and the second electrode of the ninth transistor T9 is electrically connected to the fourth voltage terminal V4. One of the polar plates of the third capacitor C3 is electrically connected to the fourth node N4, and the other of the polar plates is electrically connected to the fourth voltage terminal V4.

For example, when the signal of the fourth node N4 is a high-level signal, the ninth transistor T9 is turned on, and the low-level signal of the fourth voltage terminal V4 is written into the output terminal EOUT via the ninth transistor T9. At the same time, the fourth node N4, when being written with the high-level signal, charges the third capacitor C3, and when the fourth node N4 is floating, the fourth node N4 can maintain the high-level signal under the effect of the third capacitor C3.

Figure 14:
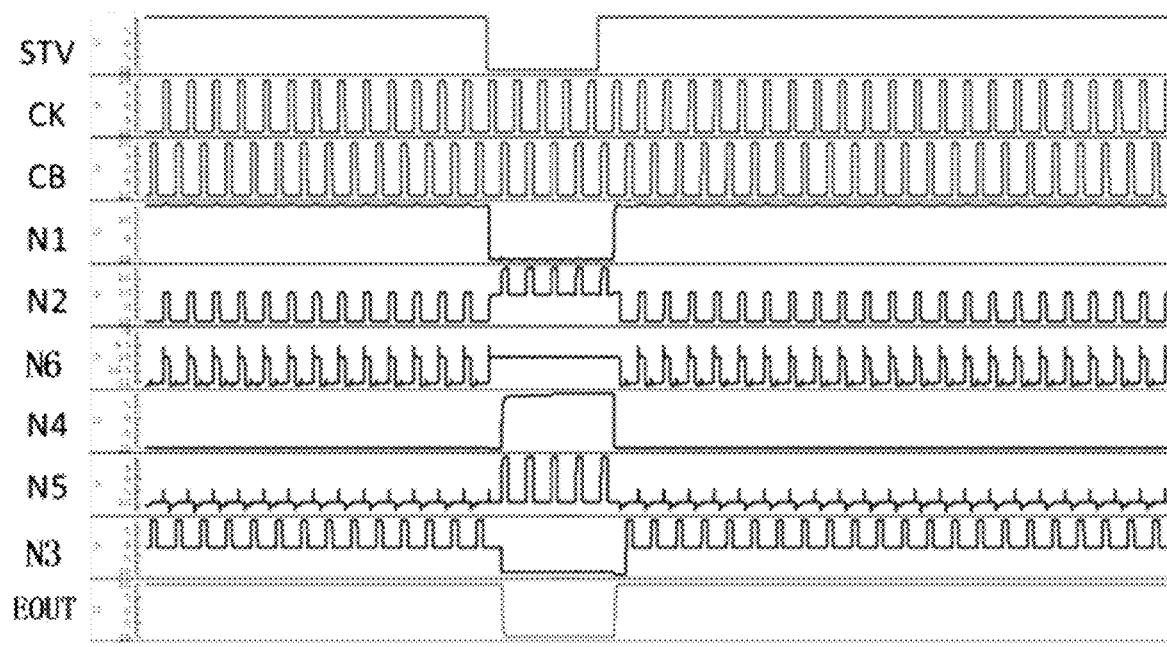
FIG. 14 schematically shows potential diagrams of the shift register shown in FIG. 12 in the operating process.
Figure 15:
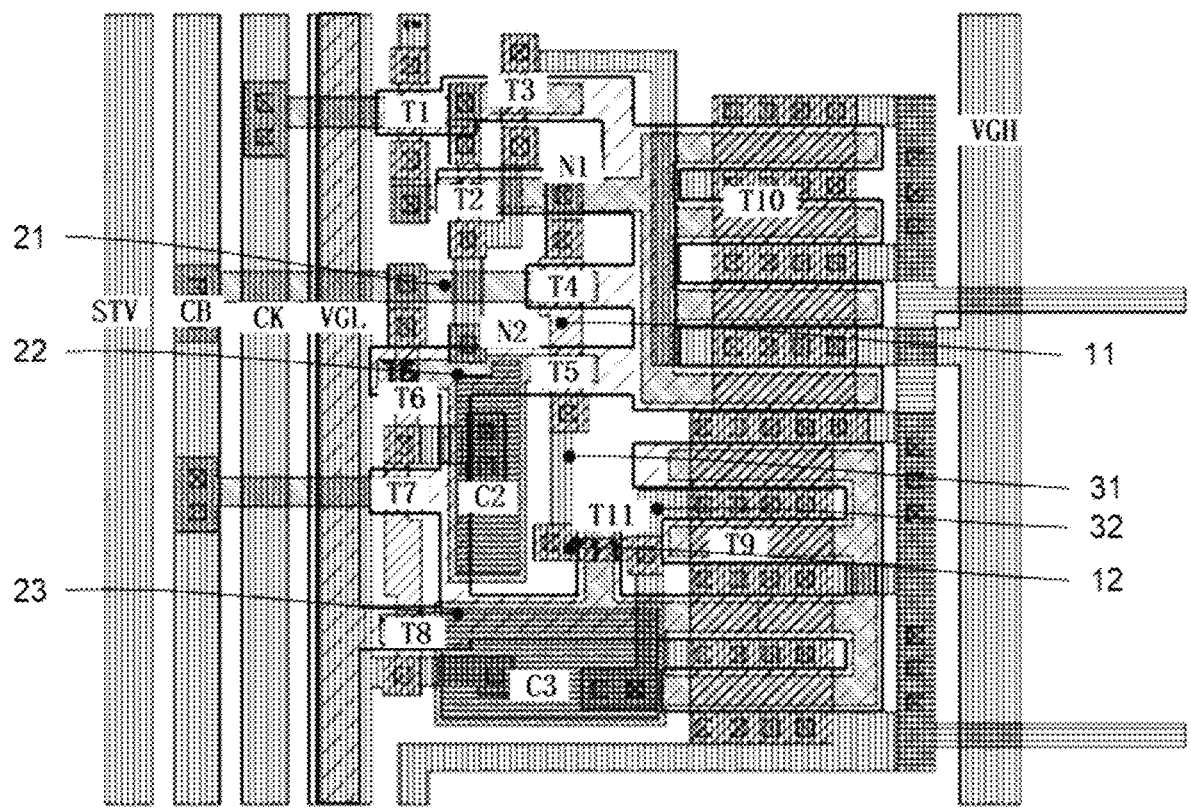
FIG. 15 schematically shows a layout of a shift register.

FIG. 14 schematically shows sequence diagrams of the signals of the signal terminals in the shift register. FIG. 15 schematically shows potential diagrams of the shift register in the operating process. The operating process of the shift register shown in FIG. 13 will be described in detail below with reference to FIG. 14 and FIG. 15.

At a stage A, the start-signal terminal STV is introduced with a low-level signal, the first clock-signal terminal CK is introduced with a high-level signal, and the second clock-signal terminal CB is introduced with a low-level signal. The first transistor T1 is turned on under the control of the high-level signal of the first clock-signal terminal CK, the first transistor T1 writes the low-level signal of the start-signal terminal STV into the first node N1, the second transistor T2, the eighth transistor T8 and the tenth transistor T10 are turned off under the control of the low-level signal of the first node N1, and the first voltage terminal V1 and the output terminal EOUT are not switched on with each other. The third transistor T3 is turned on under the control of the high-level signal of the first clock-signal terminal CK, the third transistor T3 writes the high-level signal of the second voltage terminal V2 into the second node N2, the fifth transistor T5 is turned on under the control of the high-level signal of the second node N2, the fifth transistor T5 writes the low-level signal of the fifth voltage terminal V5 into a sixth node N6, the fourth transistor T4 is turned off under the control of the low-level signal of the second clock-signal terminal CB, and a third node N3 and the first node N1 are not switched on. The sixth transistor T6 is turned on under the control of the high-level signal of the second node N2, the sixth transistor T6 writes the low-level signal of the second clock-signal terminal CB into the fifth node N5, and the second capacitor C2 electrically connected between the second node N2 and the fifth node N5 is charged at the same time. The seventh transistor T7 is turned off under the control of the low-level signal of the second clock-signal terminal CB, to cause the fourth node N4 to be floating, the eleventh transistor T11 is turned off, and the third node N3 and the sixth node N6 are not switched on. The ninth transistor T9 is turned off under the control of the signal of the fourth node N4, and the fourth voltage terminal V4 and the output terminal EOUT are not switched on with each other. Therefore, the output terminal EOUT is not switched on with the fourth voltage terminal V4 and the first voltage terminal V1, and the output terminal EOUT is floating.

At a stage B, the start-signal terminal STV is introduced with a low-level signal, the first clock-signal terminal CK is introduced with a low-level signal, and the second clock-signal terminal CB is introduced with a high-level signal. The first transistor T1 and the third transistor T3 are turned off under the control of the low-level signal of the first clock-signal terminal CK, the start-signal terminal STV and the first node N1 are not switched on with each other, and the second voltage terminal V2 and the second node N2 are not switched on with each other. The second node N2 maintains the high-level signal under the effect of the second capacitor C2. The sixth transistor T6 is turned on under the control of the high-level signal of the second node N2, the seventh transistor T7 is turned on under the control of the high-level signal of the second clock-signal terminal CB, the second clock-signal terminal CB and the fourth node N4 are switched on with each other, the high-level signal of the second clock-signal terminal CB is written into the fourth node N4, and the third capacitor C3 electrically connected between the third voltage terminal V3 and the fourth node N4 is charged at the same time. The fifth transistor T5 is turned on under the control of the high-level signal of the second node N2, the fifth voltage terminal V5 and the sixth node N6 are switched on, the fourth transistor T4 is turned on under the control of the high-level signal of the second clock-signal terminal CB, the third node N3 and the first node N1 are switched on, the eleventh transistor T11 is turned on under the control of the high-level signal of the fourth node N4, and the third node N3 and the sixth node N6 are switched on, so that the fifth voltage terminal V5 and the first node N1 are switched on with each other, and the low-level signal of the fifth voltage terminal V5 is written into the first node N1. The second transistor T2, the eighth transistor T8 and the tenth transistor T10 are turned off under the control of the low-level signal of the first node N1, and the first voltage terminal V1 and the output terminal EOUT are not switched on with each other. The ninth transistor T9 is turned on under the control of the high-level signal of the fourth node N4, the fourth voltage terminal V4 and the output terminal EOUT are switched on with each other, the low-level signal of the fourth voltage terminal V4 is written into the output terminal EOUT, and the shift register outputs a low-level signal.

At a stage C, the start-signal terminal STV is introduced with a low-level signal, the first clock-signal terminal CK is introduced with a high-level signal, and the second clock-signal terminal CB is introduced with a low-level signal. The first transistor T1 is turned on under the control of the high-level signal of the first clock-signal terminal CK, and the low-level signal of the start-signal terminal STV is written into the first node N1 via the first transistor T1. The second transistor T2, the eighth transistor T8 and the tenth transistor T10 are turned off under the control of the low-level signal of the first node N1, and the first voltage terminal V1 and the output terminal EOUT are not switched on with each other. The third transistor T3 is turned on under the control of the high-level signal of the first clock-signal terminal CK, and the high-level signal of the second voltage terminal V2 is written into the second node N2 via the third transistor T3. The sixth transistor T6 is turned on under the control of the high-level signal of the second node N2, the low-level signal of the second clock-signal terminal CB is written into the fifth node N5 via the sixth transistor T6, and the capacitor of the second capacitor C2 electrically connected between the second node N2 and the fifth node N5 is charged at the same time. The seventh transistor T7 is turned off under the control of the low-level signal of the second clock-signal terminal CB, and the fifth node N5 and the fourth node N4 are not switched on with each other. The fourth node N4 maintains the high-level signal under the effect of the third capacitor C3. The eleventh transistor T11 is turned on under the control of the high-level signal of the fourth node N4, the sixth node N6 and the third node N3 are switched on, the fifth transistor T5 is turned on under the control of the high-level signal of the second node N2, the fifth voltage terminal V5 and the sixth node N6 are switched on, the fifth transistor T5 writes the low-level signal of the fifth voltage terminal V5 into the third node N3, the fourth transistor T4 is turned off under the control of the low-level signal of the second clock-signal terminal CB, and the third node N3 and the first node N1 are not switched on. The ninth transistor T9 is turned on under the control of the high-level signal of the fourth node N4, the fourth voltage terminal V4 and the output terminal EOUT are switched on with each other, and the shift register outputs a low-level signal via the output terminal EOUT.

At a stage D, the start-signal terminal STV is introduced with a high-level signal, the first clock-signal terminal CK is introduced with a low-level signal, and the second clock-signal terminal CB is introduced with a high-level signal. The first transistor T1 and the third transistor T3 are turned off under the control of the low-level signal of the first clock-signal terminal CK. The second node N2 maintains the high-level signal under the effect of the second capacitor C2. The sixth transistor T6 is turned on under the control of the high-level signal of the second node N2, the seventh transistor T7 is turned on under the control of the high-level signal of the second clock-signal terminal CB, the second clock-signal terminal CB and the fourth node N4 are switched on with each other, and the high-level signal of the second clock-signal terminal CB is written into the fourth node N4. The eleventh transistor is turned on under the control of the high-level signal of the fourth node N4, the fifth transistor T5 is turned on under the control of the high-level signal of the second node N2, the fourth transistor T4 is turned on under the control of the high-level signal of the second clock-signal terminal CB, the fifth voltage terminal V5 and the first node N1 are switched on with each other, and the low-level signal of the fifth voltage terminal V5 is written into the first node N1. The second transistor T2, the eighth transistor T8 and the tenth transistor T10 are turned off under the control of the low-level signal of the first node N1, and the first voltage terminal V1 and the output terminal EOUT are not switched on with each other. The ninth transistor T9 is turned on under the control of the high-level signal of the fourth node N4, the fourth voltage terminal V4 and the output terminal EOUT are switched on with each other, the low-level signal of the fourth voltage terminal V4 is written into the output terminal EOUT, and the shift register outputs a low-level signal via the output terminal EOUT.

At a stage E, the start-signal terminal STV is introduced with a high-level signal, the first clock-signal terminal CK is introduced with a high-level signal, and the second clock-signal terminal CB is introduced with a low-level signal. The first transistor T1 is turned on under the control of the high-level signal of the first clock-signal terminal CK, and the high-level signal of the start-signal terminal STV is written into the first node N1 via the first transistor T1. Because of the transistor characteristics of the first transistor T1, the voltage of the first node N1 is the voltage Vh of the start-signal terminal STV minus the threshold voltage Vth of the first transistor T1; in other words, the voltage of the first node N1 is Vh-Vth. The tenth transistor T10 is turned on under the control of the high-level signal of the first node N1, the first voltage terminal V1 and the output terminal EOUT are switched on with each other, and the high-level signal of the first voltage terminal V1 is written into the output terminal EOUT. Furthermore, because the tenth transistor T10 itself forms a capacitor Cgs, and the Cgs is equivalent to that one of the polar plates is electrically connected to the first node N1, and the other of the polar plates is electrically connected to the output terminal EOUT, when the high-level signal of the first voltage terminal V1 is written into the output terminal EOUT, the electrical level of the output terminal EOUT increases, and, under the coupling effect of the capacitor Cgs, the electrical level of the first node N1, after increasing, is greater than the electrical level of the start-signal terminal STV. At the same time, the third transistor T3 is turned on under the control of the high-level signal of the first clock-signal terminal CK, and the high-level signal of the second voltage terminal V2 is written into the second node N2. The fifth transistor T5 is turned on under the control of the high-level signal of the second node N2, and the low-level signal of the fifth voltage terminal V5 is written into the sixth node N6 via the fifth transistor T5. The eighth transistor T8 is turned on under the control of the high-level signal of the first node N1, and the low-level signal of the third voltage terminal V3 is written into the fourth node N4 via the eighth transistor T8. The eleventh transistor T11 is turned off under the control of the low-level signal of the fourth node N4, and the sixth node N6 and the third node N3 are not switched on. The fourth transistor T4 is turned off under the control of the low-level signal of the second clock-signal terminal CB, and the third node N3 and the first node N1 are not switched on with each other. The sixth transistor T6 is turned on under the control of the high-level signal of the second node N2, the low-level signal of the second clock-signal terminal CB is written into the fifth node N5 via the sixth transistor T6, and at the same time, the second capacitor C2 is charged. The seventh transistor T7 is turned off under the control of the low-level signal of the second clock-signal terminal CB, and the fifth node N5 and the fourth node N4 are not switched on with each other. The ninth transistor T9 is turned off under the control of the low-level signal of the fourth node N4, and the fourth voltage terminal V4 and the output terminal EOUT are not switched on with each other. The shift register outputs a high-level signal via the output terminal EOUT.

At a stage F, the start-signal terminal STV is introduced with a high-level signal, the first clock-signal terminal CK is introduced with a low-level signal, and the second clock-signal terminal CB is introduced with a high-level signal. The first transistor T1 and the third transistor T3 are turned off under the control of the low-level signal of the first clock-signal terminal CK. The fourth transistor T4 is turned on under the control of the high-level signal of the second clock-signal terminal CB, the first node N1 and the third node N3 are switched on, and a part of the electric charges of the first node N1 are written into the node N3, so that the electrical level of the first node N1 decreases. Because the tenth transistor T10 itself forms a capacitor Cgs, under the effect of the capacitor Cgs, the first node N1 maintains the high-level signal. The second transistor T2 is turned on under the control of the high-level signal of the first node N1, the low-level signal of the first clock-signal terminal CK is written into the second node N2 via the second transistor T2, the fifth transistor T5 is turned off under the control of the low-level signal of the second node N2, and the sixth node N6 and the fifth voltage terminal are not switched on with each other. At the same time, the eighth transistor T8 is turned on under the control of the high-level signal of the first node N1, and the low-level signal of the third voltage terminal V3 is written into the fourth node N4 via the eighth transistor T8. The eleventh transistor T11 is turned off under the control of the low-level signal of the fourth node N4, and the sixth node N6 and the third node N3 are not switched on. Because the third node N3 and the fifth voltage terminal V5 are not switched on with each other, the electric charges of the third node N3 are not released to the fifth voltage terminal V5, so that the electrical level of the first node N1 does not decrease continuously, the high-level signal of the first node N1 can still control the tenth transistor T10 to be turned on, and the high-level signal of the first voltage terminal V1 is written into the output terminal EOUT via the tenth transistor T10. The ninth transistor T9 is turned off under the control of the low-level signal of the fourth node N4, and the fourth voltage terminal V4 and the output terminal EOUT are not switched on with each other. The shift register outputs a high-level signal via the output terminal EOUT.

At a stage G, the start-signal terminal STV is introduced with a high-level signal, the first clock-signal terminal CK is introduced with a high-level signal, and the second clock-signal terminal CB is introduced with a low-level signal. As compared with the stage E, because, at the stage G, the electrical level of the first node N1 is greater than the electrical level of the start-signal terminal STV, the source electrode of the first transistor T1 is electrically connected to the start-signal terminal STV, and the drain electrode of the first transistor T1 is electrically connected to the first node N1. At this moment, the Vgs of the first transistor T1 is the high-level signal of the first clock-signal terminal CK minus the high-level signal of the start-signal terminal STV, which is less than the threshold voltage of the first transistor T1 (for example, the high-level signal of the first clock-signal terminal CK is equal to the high-level signal of the start-signal terminal STV, and Vgs is equal to 0), the first transistor T1 is turned off, and the start-signal terminal STV and the first node N1 are not switched on with each other. Furthermore, the third transistor T3 is turned on under the control of the high-level signal of the first clock-signal terminal CK, the high-level signal of the second voltage terminal V2 is written into the second node N2 via the third transistor T3, the fifth transistor T5 is turned on under the control of the high-level signal of the second node N2, and the fifth voltage terminal V5 and the sixth node N6 are switched on with each other. Because the eighth transistor T8 is turned on under the control of the high-level signal of the first node N1, the low-level signal of the third voltage terminal V3 is written into the fourth node N4 via the eighth transistor T8, the eleventh transistor T11 is turned off under the control of the low-level signal of the fourth node N4, and the third node N3 and the sixth node N6 are not switched on with each other, the electric charges written by the third node N3 at the stage F cannot be released via the fifth voltage terminal V5.

In a displaying frame of the display panel, the stage F and the stage G are alternately performed. At the stage F, a part of the electric charges of the first node N1 are written into the third node N3, which reduces the electric potential of the first node N1. At the stage G, because the eleventh transistor T11 is turned off, the third node N3 and the sixth node N6 are not switched on, or, in other words, the third node N3 and the fifth voltage terminal V5 are not switched on, and the electric charges written by the third node N3 cannot be released to the fifth voltage terminal V5. When the stage F and the stage G are alternately performed, the electric potential of the first node N1 may not decrease continuously, so that the first node N1 can maintain the high electric potential, thereby turning-off of the tenth transistor T10 caused by decreasing of the electric potential of the first node N1 is reduced, so that the output terminal EOUT is enabled to output stably.

The operating processes of the shift registers shown in FIG. 11 and FIG. 12 are similar to the operating process of the shift register shown in FIG. 13, and both of them can realize the following effect. When the tenth transistor turns on the output terminal EOUT to output a high-level signal, the signal of the fourth node N4 is a low-level signal, and the eleventh transistor 11 maintains being turned off under the control of the low-level signal of the fourth node N4, so that the fifth voltage terminal V5 and the first node N1 maintain being disconnected from each other, and the electric charges of the first node N1 cannot be released to the fifth voltage terminal V5, so that the first node N1 can maintain the high-level signal, thus the tenth transistor T10 is turned on under the control of the high-level signal of the first node N1, so that the shift register can output the high-level signal of the first voltage terminal V1. Furthermore, when the ninth transistor T9 is turned on, the signal of the fourth node N4 is a high-level signal, and the eleventh transistor T11 maintains being turned on under the control of the high-level signal of the fourth node N4, so that the fourth transistor T4 and the fifth transistor T5 are turned on under the cooperation between the signal of the second node N2 and the second clock signal, thus the low-level signal of the fifth voltage terminal V5 is written into the first node N1, so that the tenth transistor T10 maintains being turned off under the control of the low-level signal of the first node N1.

Figure 16:
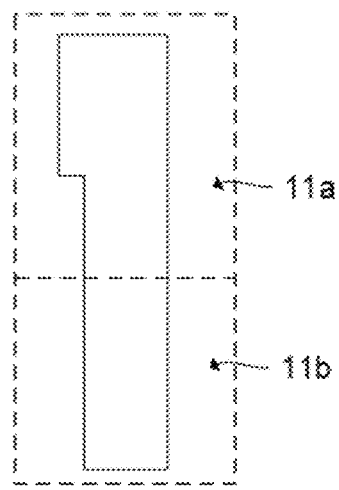
FIG. 16 schematically shows a layout of a first semiconductor strip.

FIG. 15 schematically shows a layout of a shift register. FIG. 16 schematically shows a layout of a first semiconductor strip.

As shown in FIG. 15, the display panel includes a semiconductor layer, a first electrically conductive layer and a second electrically conductive layer that are disposed at one side of the substrate.

The semiconductor layer includes a first semiconductor strip 11 and a second semiconductor strip 12, the first semiconductor strip 11 includes an active layer of a fourth transistor T4 and an active layer of a fifth transistor T5, and the second semiconductor strip 12 includes an active layer of the eleventh transistor T11.

The first electrically conductive layer includes a first electrically conductive strip 21, a second electrically conductive strip 22 and a third electrically conductive strip 23, the first electrically conductive strip 21 includes a gate electrode of the fourth transistor T4, the second electrically conductive strip 22 includes a gate electrode of the fifth transistor T5, a gate electrode of a sixth transistor T6 and one of the polar plates of a second capacitor C2, and the third electrically conductive strip 23 includes a gate electrode of the eleventh transistor T11, a gate electrode of a ninth transistor T9 and one of the polar plates of a third capacitor C3.

The second electrically conductive layer includes a first bridging line 31, and the first bridging line 31 is electrically connected to the first semiconductor strip 11 and the second semiconductor strip 12 by a via hole.

The first bridging line 31 is electrically connected to the first semiconductor strip 11 and the second semiconductor strip 12 by the via hole, so that the first semiconductor strip 11 and the second semiconductor strip 12 are electrically connected. The first semiconductor strip 11 includes the active layer of the fourth transistor T4 and the active layer of the fifth transistor T5. The second semiconductor strip 12 includes the active layer of the eleventh transistor T11. In other words, the fourth transistor T4, the fifth transistor T5 and the eleventh transistor T11 are connected in series.

As an example, the semiconductor layer further includes a third semiconductor strip 13. The third semiconductor strip includes the active layer of the ninth transistor T9. The second electrically conductive layer further includes a second bridging line 32. The second bridging line 32 is electrically connected to the active layer of the ninth transistor T9 and the second semiconductor strip 12 by the via hole. The active layer of the ninth transistor T9 is electrically connected to a second voltage line. The second voltage line may be introduced with a low-level signal. When the eleventh transistor T11 is turned off, the electric connection of the fourth transistor T4 and the fifth transistor T5 with the second voltage line can be disconnected, thereby that the electric charges of the first node are released to the second voltage line via the fourth transistor T4, the fifth transistor T5 and the eleventh transistor T11 is prevented.

As shown in FIG. 16, the first semiconductor strip includes a first region 11a and a second region 11b, the first region 11a is the active layer of the fourth transistor T4, and the second region 11b is the active layer of the fifth transistor T5. The first bridging line 31 is connected by the via hole to the end of the first region 11a away from the second region 11b, or the first bridging line 31 is connected by the via hole to the end of the second region 11b away from the first region 11a.

When the first bridging line 31 is connected by the via hole to the end of the first region 11a away from the second region 11b, the eleventh transistor T11 is connected between the fourth transistor T4 and the first node N1. When the first bridging line 31 is connected by the via hole to the end of the second region 11b away from the first region 11a, the eleventh transistor T11 is connected between the second voltage line and the fifth transistor T5.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to actual demands to realize the purposes of the solutions of the embodiments. A person skilled in the art can understand and implement the technical solutions without paying creative work.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same one embodiment.

The description provided herein describes many concrete details. However, it can be understood that the embodiments of the present application may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present application may be implemented by means of hardware including several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A shift register, wherein the shift register comprises:
a first inputting circuit electrically connected to a start-signal terminal, a first node and a first clock-signal terminal, wherein the first inputting circuit is configured for, under control of a first clock signal of the first clock-signal terminal, writing a signal of the start-signal terminal into the first node;
a first outputting circuit electrically connected to the first node, an output terminal and a first voltage terminal, wherein the first outputting circuit is configured for, when switched on under control of a signal of the first node, writing a signal of the first voltage terminal into the output terminal;
a second inputting circuit electrically connected to the first node, a second node, a second voltage terminal and the first clock-signal terminal, wherein the second inputting circuit is configured for, under the control of the signal of the first node, writing the first clock signal into the second node, and, under the control of the first clock signal, writing a signal of the second voltage terminal into the second node;
a second outputting circuit electrically connected to a fourth voltage terminal, the second node and the output terminal, wherein the second outputting circuit is configured for, when switched on under control of a signal of the second node, writing a signal of the fourth voltage terminal into the output terminal; and
a second controlling circuit electrically connected to the first node, the second node, a fifth voltage terminal, a second clock-signal terminal and a controlling terminal, wherein the second controlling circuit is configured for, under the control of the signal of the second node, control of a second clock signal and control of a signal of the controlling terminal, when the first outputting circuit is switched on, disconnecting electric connection between the first node and the fifth voltage terminal, and when the second outputting circuit is switched on, writing a signal of the fifth voltage terminal into the first node,
wherein the second controlling circuit comprises a first sub-circuit and a second sub-circuit that are connected in series between the fifth voltage terminal and the first node,
the second sub-circuit is electrically connected to the controlling terminal, and the second sub-circuit is configured for, under the control of the signal of the controlling terminal, being disconnected when the first outputting circuit is switched on, and being switched on when the second outputting circuit is switched on,
the first sub-circuit is electrically connected to the second node and the second clock-signal terminal, and the first sub-circuit is configured for, when switched on under the control of the signal of the second node and the control of the second clock signal of the second clock-signal terminal, cooperating with the second sub-circuit to write the signal of the fifth voltage terminal into the first node, and
the controlling terminal is electrically connected to a fourth node.

2. The shift register according to claim 1, wherein the shift register further comprises a first controlling circuit, the first controlling circuit is electrically connected to the first node, the second node, a fourth node, the second clock-signal terminal and a third voltage terminal, and the first controlling circuit is configured for, under the control of the signal of the second node and the control of the second clock signal of the second clock-signal terminal, writing the second clock signal into the fourth node, and, under the control of the signal of the first node, writing a signal of the third voltage terminal into the fourth node.

3. The shift register according to claim 2, wherein the controlling terminal is electrically connected to the fourth node.

4. The shift register according to claim 2, wherein the first inputting circuit comprises a first transistor, a first electrode of the first transistor is electrically connected to the start-signal terminal, a second electrode of the first transistor is electrically connected to the first node, and a control electrode of the first transistor is electrically connected to the first clock-signal terminal.

5. The shift register according to claim 1, wherein the first sub-circuit comprises a fourth transistor and a fifth transistor, a control electrode of the fourth transistor is electrically connected to the second clock-signal terminal, and a first electrode of the fourth transistor is electrically connected to the first node; a control electrode of the fifth transistor is electrically connected to the second node, a first electrode of the fifth transistor is electrically connected to a second electrode of the fourth transistor, and a second electrode of the fifth transistor is electrically connected to the fifth voltage terminal, and
the second sub-circuit is electrically connected between the fourth transistor and the fifth transistor, or between the fourth transistor and the first node, or between the fifth transistor and the fifth voltage terminal.

6. The shift register according to claim 5, wherein the second sub-circuit comprises an eleventh transistor, and a control electrode of the eleventh transistor is electrically connected to the controlling terminal; and
a first electrode of the eleventh transistor is electrically connected to the first node, and a second electrode of the eleventh transistor is electrically connected to the first electrode of the fourth transistor; or
the first electrode of the eleventh transistor is electrically connected to the second electrode of the fourth transistor, and the second electrode of the eleventh transistor is electrically connected to the first electrode of the fifth transistor; or
the first electrode of the eleventh transistor is electrically connected to the second electrode of the fifth transistor, and the second electrode of the eleventh transistor is electrically connected to the fifth voltage terminal.

7. The shift register according to claim 1, wherein the first inputting circuit comprises a first transistor, a first electrode of the first transistor is electrically connected to the start-signal terminal, a second electrode of the first transistor is electrically connected to the first node, and a control electrode of the first transistor is electrically connected to the first clock-signal terminal.

8. The shift register according to claim 1, wherein the first outputting circuit comprises a tenth transistor, a first electrode of the tenth transistor is electrically connected to the output terminal, a second electrode of the tenth transistor is electrically connected to the first voltage terminal, and a control electrode of the tenth transistor is electrically connected to the first node.

9. The shift register according to claim 8, wherein the first outputting circuit further comprises a first capacitor, one of polar plates of the first capacitor is electrically connected to the first node, and the other of the polar plates of the first capacitor is electrically connected to the output terminal.

10. The shift register according to claim 1, wherein the second inputting circuit comprises:
   a second transistor, wherein a control electrode of the second transistor is electrically connected to the first node, a first electrode of the second transistor is electrically connected to the second node, and a second electrode of the second transistor is electrically connected to the first clock-signal terminal; and
   a third transistor, wherein a control electrode of the third transistor is electrically connected to the first clock-signal terminal, a first electrode of the third transistor is electrically connected to the second node, and a second electrode of the third transistor is electrically connected to the second voltage terminal.

11. The shift register according to claim 1, wherein the first controlling circuit comprises:
   a sixth transistor, wherein a control electrode of the sixth transistor is electrically connected to the second node, a first electrode of the sixth transistor is electrically connected to a fifth node, and a second electrode of the sixth transistor is electrically connected to the second clock-signal terminal;
   a seventh transistor, wherein a control electrode of the seventh transistor is electrically connected to the second clock-signal terminal, a first electrode of the seventh transistor is electrically connected to the fourth node, and a second electrode of the seventh transistor is electrically connected to the fifth node;
   an eighth transistor, wherein a control electrode of the eighth transistor is electrically connected to the first node, a first electrode of the eighth transistor is electrically connected to the fourth node, and a second electrode of the eighth transistor is electrically connected to the third voltage terminal; and
   a second capacitor, wherein one of polar plates of the second capacitor is electrically connected to the first node, and the other of the polar plates of the second capacitor is electrically connected to the fifth node.

12. The shift register according to claim 1, wherein the second outputting circuit comprises:
   a ninth transistor, wherein a control electrode of the ninth transistor is electrically connected to the fourth node, a first electrode of the ninth transistor is electrically connected to the output terminal, and a second electrode of the ninth transistor is electrically connected to the fourth voltage terminal; and
   a third capacitor, wherein one of polar plates of the third capacitor is electrically connected to the fourth node, and the other of the polar plates of the third capacitor is electrically connected to the fourth voltage terminal.

13. The shift register according to claim 1, wherein the first voltage terminal and the second voltage terminal are configured to be electrically connected to a same signal terminal.

14. The shift register according to claim 1, wherein a third voltage terminal, the fourth voltage terminal and the fifth voltage terminal are configured to be electrically connected to a same signal terminal.

15. A scanning driving circuit, wherein the scanning driving circuit comprises a plurality of the shift registers according to claim 1, and the plurality of shift registers are cascaded.

16. A displaying device, wherein the displaying device comprises a plurality of pixel driving circuits and the scanning driving circuit according to claim 15, each of the pixel driving circuits comprises a plurality of transistors, and the output terminals of the shift registers in the scanning driving circuit are electrically connected to the control electrodes of the transistors, to supply an enabling signal.

17. A display panel, wherein the display panel comprises:
   a substrate, wherein a scanning driving circuit is disposed at one side of the substrate, the scanning driving circuit comprises a plurality of shift registers that are cascaded, each of the shift registers comprises a second outputting circuit, a first controlling circuit, and a second controlling circuit, and the second controlling circuit comprises a first sub-circuit and a second sub-circuit that are connected in series between a fifth voltage terminal and a first node, the first sub-circuit comprises a fourth transistor and a fifth transistor, the second sub-circuit comprises an eleventh transistor, the first controlling circuit comprises a sixth transistor, a seventh transistor, an eighth transistor and a second capacitor, and the second outputting circuit comprises a ninth transistor and a third capacitor;
   a semiconductor layer comprising a first semiconductor strip and a second semiconductor strip, wherein the first semiconductor strip comprises an active layer of the fourth transistor and an active layer of the fifth transistor, and the second semiconductor strip comprises an active layer of the eleventh transistor;
   a first electrically conductive layer comprising a first electrically conductive strip, a second electrically conductive strip and a third electrically conductive strip, wherein the first electrically conductive strip comprises a gate electrode of the fourth transistor, the second electrically conductive strip comprises a gate electrode of the fifth transistor, a gate electrode of the sixth transistor and one of polar plates of the second capacitor, and the third electrically conductive strip comprises a gate electrode of the eleventh transistor, a gate electrode of the ninth transistor and one of polar plates of the third capacitor; and
   a second electrically conductive layer comprising a first bridging line, wherein the first bridging line is electrically connected to the first semiconductor strip and the second semiconductor strip by a via hole.

18. The display panel according to claim 17, wherein the first semiconductor strip comprises a first region and a second region, the first region is the active layer of the fourth transistor, and the second region is the active layer of the fifth transistor; and the first bridging line is connected by the via hole to one end of the first region away from the second region, or the first bridging line is connected by the via hole to one end of the second region away from the first region.

* * * * *